US011153332B2

(12) United States Patent
Dichiu et al.

(10) Patent No.: US 11,153,332 B2
(45) Date of Patent: Oct. 19, 2021

(54) SYSTEMS AND METHODS FOR BEHAVIORAL THREAT DETECTION

(71) Applicant: Bitdefender IPR Management Ltd., Nicosia (CY)

(72) Inventors: Daniel Dichiu, Bucharest (RO); Stefan Niculae, Dobroesti (RO); Elena A. Bosinceanu, Fetesti (RO); Sorina N. Stoian, Nehoiu (RO); Andreea Dincu, Bucharest (RO); Andrei A. Apostoae, Ciorani (RO)

(73) Assignee: Bitdefender IPR Management Ltd., Nicosia (CY)

( * ) Notice: Subject to any disclaimer, the term of this patent is extended or adjusted under 35 U.S.C. 154(b) by 251 days.

(21) Appl. No.: 16/215,251

(22) Filed: Dec. 10, 2018

(65) Prior Publication Data
US 2020/0186546 A1    Jun. 11, 2020

(51) Int. Cl.
*H04L 29/06*    (2006.01)
*G06N 5/02*    (2006.01)

(52) U.S. Cl.
CPC ........... *H04L 63/1416* (2013.01); *G06N 5/02* (2013.01); *H04L 63/1425* (2013.01)

(58) Field of Classification Search
CPC ........ G06F 21/552; G06N 20/00; G06N 5/02; H04L 63/1416; H04L 63/1425; H04L 63/14
See application file for complete search history.

(56) References Cited

U.S. PATENT DOCUMENTS

| 6,742,124 | B1 | 5/2004 | Kilpatrick et al. |
| 6,973,577 | B1 | 12/2005 | Kouznetsov |
| 7,035,863 | B2 | 4/2006 | Kurapati et al. |

(Continued)

FOREIGN PATENT DOCUMENTS

KR    1018111620000 B1    12/2017

OTHER PUBLICATIONS

Lampesberger, H; Empirical Evaluation of the Internet Analysis System for Application in the Field of Anomaly Detection; 2010 European Conference on Computer Network Defense (pp. 63-70); (Year: 2010).*

(Continued)

*Primary Examiner* — Jahangir Kabir
*Assistant Examiner* — Chao Wang
(74) *Attorney, Agent, or Firm* — Law Office of Andrei D Popovici, PC

(57) ABSTRACT

In some embodiments, a behavioral computer security system protects clients and networks against threats such as malicious software and intrusion. A set of client profiles is constructed according to a training corpus of events occurring on clients, wherein each client profile represents a subset of protected machines, and each client profile is indicative of a normal or baseline pattern of using the machines assigned to the client respective profile. A client profile may group together machines having a similar event statistic. Following training, events detected on a client are selectively analyzed against a client profile associated with the respective client, to detect anomalous behavior. In some embodiments, individual events are analyzed in the context of other events, using a multi-dimensional event embedding space.

23 Claims, 15 Drawing Sheets

(56) References Cited

U.S. PATENT DOCUMENTS

| | | | |
|---|---|---|---|
| 7,089,428 | B2 | 8/2006 | Farley et al. |
| 7,234,166 | B2 | 6/2007 | Nurmela |
| 7,716,739 | B1 | 5/2010 | McCorkendale |
| 7,818,797 | B1 | 10/2010 | Fan et al. |
| 8,135,994 | B2 | 3/2012 | Keromytis et al. |
| 8,370,931 | B1 | 2/2013 | Chien et al. |
| 8,448,249 | B1 | 5/2013 | Preston |
| 8,572,239 | B2 | 10/2013 | Cao et al. |
| 8,661,034 | B2 | 2/2014 | Polonsky et al. |
| 8,719,936 | B2 | 5/2014 | Moffie et al. |
| 8,752,171 | B2 | 6/2014 | Edwards et al. |
| 8,839,435 | B1 | 9/2014 | King |
| 8,881,289 | B2 | 11/2014 | Basavapatna et al. |
| 8,887,274 | B2 | 11/2014 | Buchanan et al. |
| 8,887,286 | B2 | 11/2014 | Dupont et al. |
| 9,166,993 | B1 | 10/2015 | Liu |
| 9,652,316 | B2 | 5/2017 | Gamage et al. |
| 2009/0328215 | A1 | 12/2009 | Arzi et al. |
| 2012/0278354 | A1 | 11/2012 | Yan et al. |
| 2014/0215618 | A1 | 7/2014 | Striem Amit |
| 2014/0230062 | A1 | 8/2014 | Kumaran |
| 2014/0283067 | A1 | 9/2014 | Call et al. |
| 2015/0082437 | A1 | 3/2015 | Dodson |
| 2016/0149936 | A1 | 5/2016 | Pegna et al. |
| 2016/0352759 | A1 | 12/2016 | Zhai |
| 2016/0358599 | A1 | 12/2016 | Wang |
| 2017/0103343 | A1 | 4/2017 | Yee et al. |
| 2017/0140384 | A1* | 5/2017 | Zoldi .............. G06Q 40/12 |
| 2017/0171231 | A1 | 6/2017 | Reybok, Jr. |
| 2017/0237773 | A1 | 8/2017 | Wallace |
| 2018/0004961 | A1* | 1/2018 | Gil .............. H04L 63/1416 |
| 2018/0157989 | A1 | 6/2018 | Green |
| 2018/0285459 | A1 | 10/2018 | Soni et al. |
| 2019/0026466 | A1 | 1/2019 | Krasser |
| 2019/0130305 | A1 | 5/2019 | Sivertson |
| 2019/0266487 | A1 | 8/2019 | Chollet |
| 2019/0296933 | A1 | 9/2019 | Koul et al. |
| 2019/0303727 | A1 | 10/2019 | Foroughi et al. |
| 2019/0340615 | A1* | 11/2019 | Hanis .............. G06N 5/022 |

OTHER PUBLICATIONS

Rhode, Matilda • Burnap, Pete • Jones, Kevin; Early Stage Malware Prediction Using Recurrent Neural Networks; Computers & Security, vol. 77, Aug. 2018, pp. 578-594; (Year: 2017).*

Monowar H. Bhuyan • D. K. Bhattacharyya • J. K. Kalita; Network Anomaly Detection: Methods, Systems and Tools; IEEE Communications Surveys & Tutorials (vol. 16, Issue: 1, pp. 303-336); (Year: 2013).*

USPTO, Office Action dated Jan. 26, 2021 for U.S. Appl. No. 16/215,214, filed Dec. 10, 2018.

Dichiu, U.S. Appl. No. 16/215,179, filed Dec. 10, 2018.

Dichiu, U.S. Appl. No. 16/215,214, filed Dec. 10, 2018.

Hossain et al., "A Framework For an Adaptive Intrusion Detection System With Data Mining," Department of Computer Science, Mississippi State University, USA, Apr. 2002.

Marin et al., "A Hybrid Approach to the Profile Creation and Intrusion Detection," Proceedings DARPA Information Survivability Conference and Exposition II, DISCEX'01; IEEE, vol. 1., pp. 69-76, Anaheim, CA, USA, Jun. 12-14, 2001.

Teng et al., "Adaptive Real-Time Anomaly Detection Using Inductively Generated Sequential Patterns," Proceedings, 1990 IEEE Computer Security Symposium on Research in Security and Privacy, IEEE, pp. 278-284, Oakland, CA, USA, May 7-9, 1990.

Lee et al., "A Framework for Constructing Features and Models for Intrusion Detection Systems," ACM Transactions on Information and Security (TISSEC), vol. 3, No. 4, pp. 227-261, New York, NY, USA, Nov. 2000.

Lee et al., "A Data Mining Framework for Building Intrusion Detection Models," Proceedings of the 1999 IEEE Symposium on Security and Privacy (Cat. No. 99CB36344), IEEE, pp. 120-132, Oakland, CA, USA, May 14, 1999.

Mukkamala et al., "Intrusion Detection Using Neural Networks and Support Vector Machines," Proceedings of the 2002 International Joint Conference on Neural Networks IJCNN'02 (Cat. No. 02CH37290), IEEE, vol. 2, pp. 1702-1707, Honolulu, HI, USA, May 12-17, 2002.

Cisco Systems, "Cisco Network-Based Intrusion Detection-Functionalities and Configuration," Chapter 8 in "Server Farm Security in the Business Ready Data Center Architecture v2.1.," Cisco Systems, Inc., San Jose, USA, Nov. 2006.

Zhong et al., "Clustering-Based Network Intrusion Detection," International Journal of Reliability, Quality and Safety Engineering, World Scientific Publishing Company, vol. 14, No. 02, pp. 169-187, Singapore, Mar. 2007.

European Patent Office, International Search Report and Written Opinion dated Feb. 27, 2020 for PCT International Application No. PCT/EP2019/084310, international filing date Dec. 10, 2019, priority date Dec. 10, 2018.

European Patent Office, International Search Report and Written Opinion dated Feb. 28, 2020 for PCT International Application No. PCT/EP2019/084311, international filing date Dec. 10, 2019, priority date Dec. 10, 2018.

European Patent Office, International Search Report and Written Opinion dated Feb. 28, 2020 for PCT International Application No. PCT/EP2019/084312, international filing date Dec. 10, 2019, priority date Dec. 10, 2018.

USPTO, Office Action dated Dec. 30, 2020 for U.S. Appl. No. 16/215,179, filed Dec. 10, 2018.

USPTO, Notice of Allowance dated Jul. 8, 2021 for U.S. Appl. No. 16/215,179, filed Dec. 10, 2018.

USPTO, Office Action dated Aug. 13, 2021 for U.S. Appl. No. 16/215,214, filed Dec. 10, 2018.

* cited by examiner

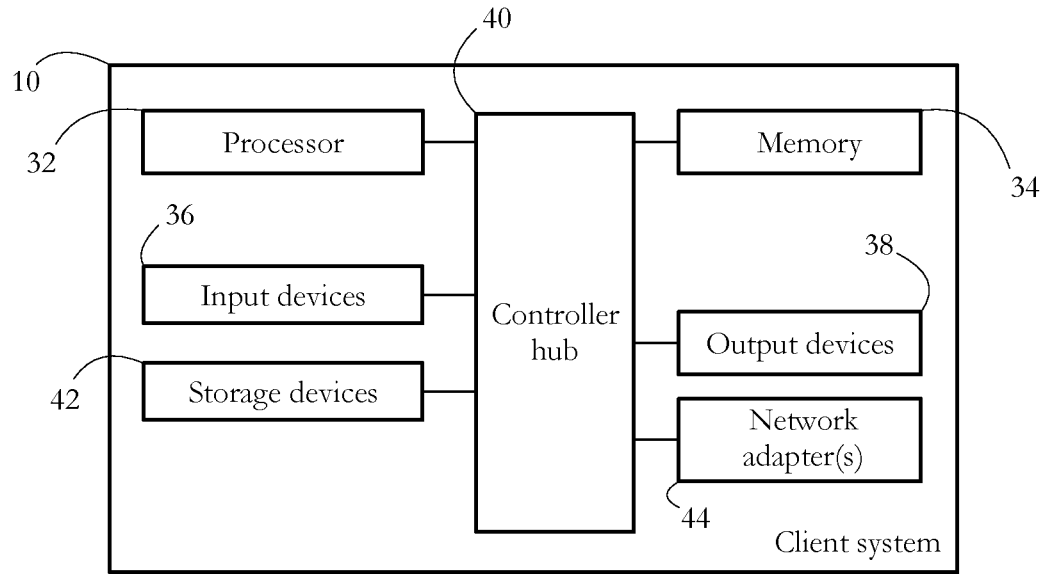
FIG. 3-A
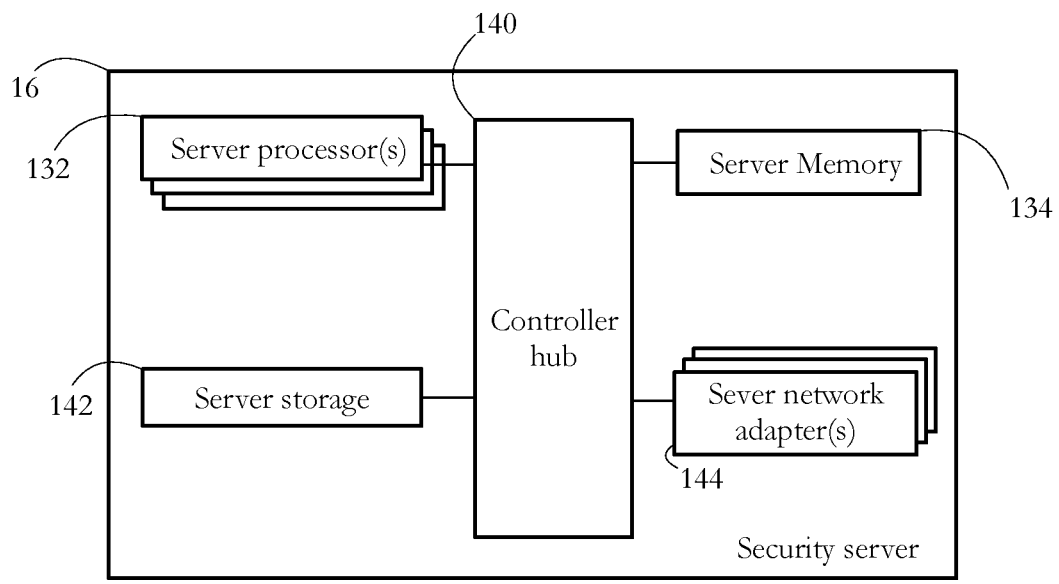
FIG. 3-B

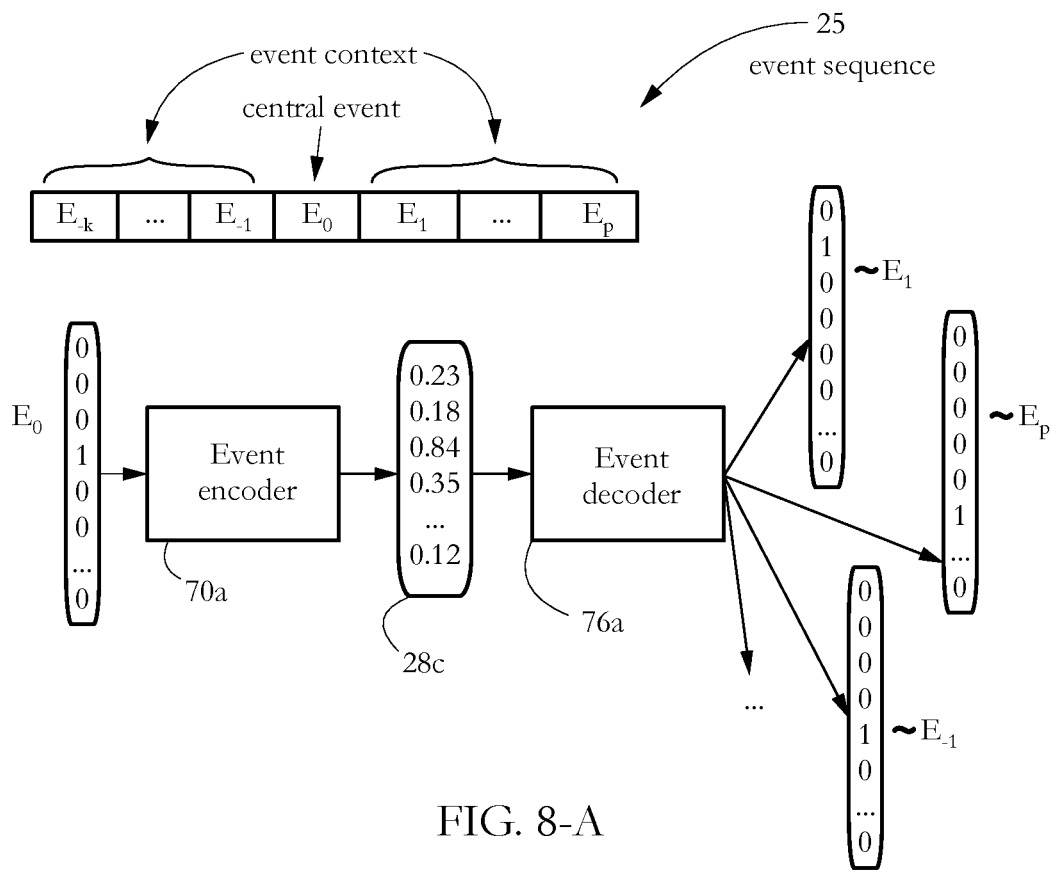
FIG. 8-A
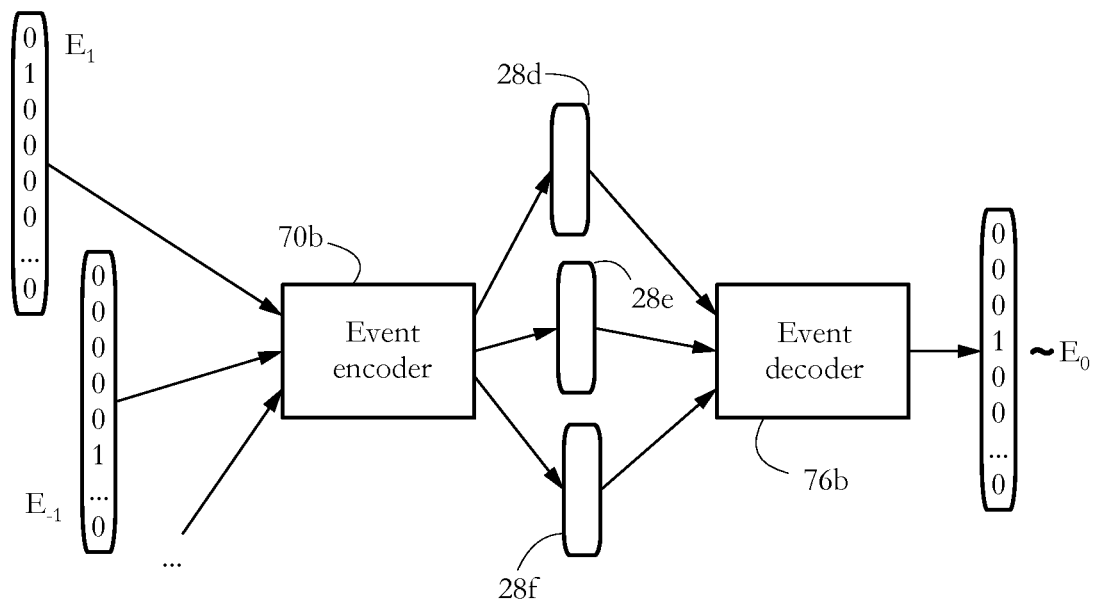
FIG. 8-B

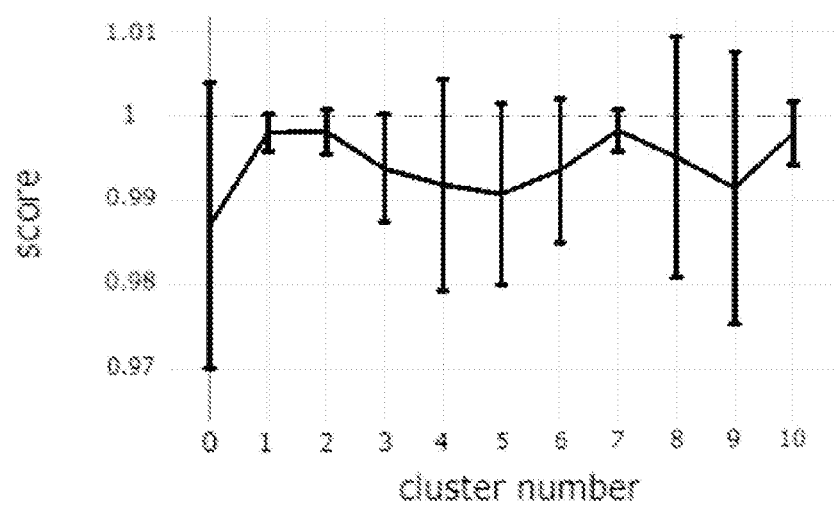
FIG. 17-A

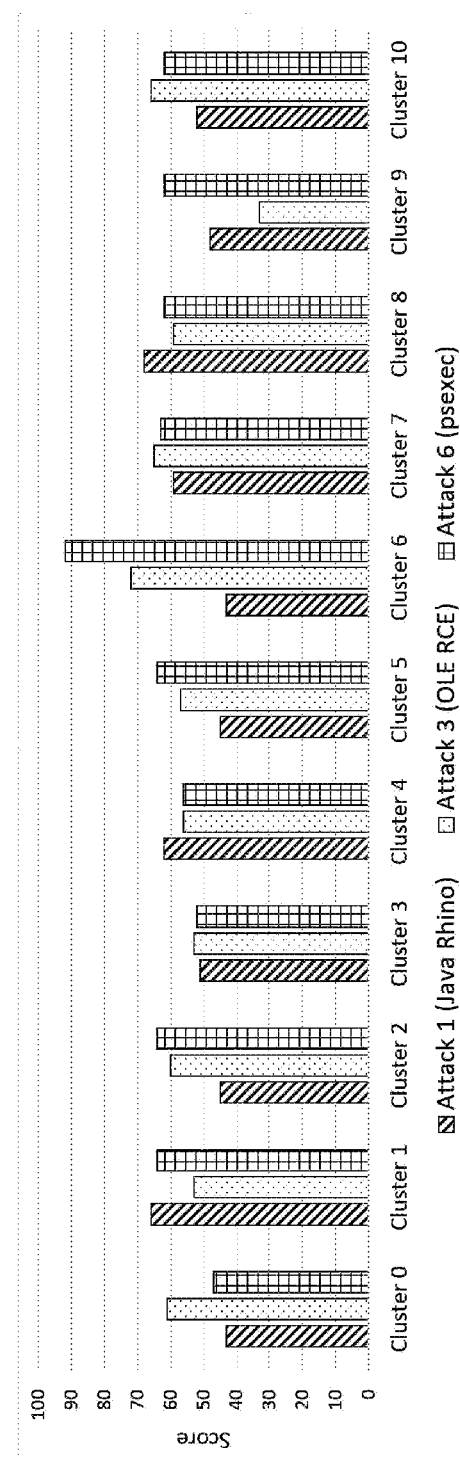
FIG. 17-B

SYSTEMS AND METHODS FOR BEHAVIORAL THREAT DETECTION

BACKGROUND

The invention relates to computer security systems and methods, and in particular to systems and methods for detecting malicious software and/or an intrusion into a computer system and/or communication network.

In recent years, computer and network security have become increasingly important for private individuals and companies alike. The rapid development of electronic communication technologies, the increasing reliance on software in daily activities, and the advent of the Internet of Things have left companies and individuals vulnerable to loss of privacy and data theft.

A skilled attacker may attempt to infiltrate a corporate network using various techniques, for instance using a backdoor installed on a corporate computer by malicious software. The attacker may then gain access to, modify, or destroy sensitive information. Other exemplary attacks include, among others, disabling or otherwise incapacitating physical security systems (e.g., a burglar alarm), installing spying software, and interfering with automated systems that control manufacturing or distribution of goods and services (e.g., the power grid).

Software executing on a computer system may be used to automatically detect and/or prevent unauthorized intrusion and other malicious activities. Such software, commonly known as an intrusion detection system (IDS), may monitor network and/or computer activities for unusual events or policy violations. A typical IDS records information related to observed events, notifies a user or network administrator, and produces reports. Some IDSs may go further to prevent the intruder from performing malicious activities, for instance, by changing security settings (e.g. reconfiguring a firewall) in response to detecting an intrusion.

However, as software services are progressively delocalized and the amount of data flowing over information networks increases, it becomes increasingly impractical for security software to sift through this vast amount of information for indicators of malicious activity. Therefore, there is substantial interest in developing more robust and scalable intrusion detection systems and methods.

SUMMARY

According to one aspect, a server computer system comprises at least one hardware processor configured, in response to receiving an indication of an occurrence of a target event on a target client system, to assemble an event sequence including the target event, all events of the event sequence having occurred on the target client system, wherein members of the event sequence are arranged according to a time of occurrence of each event of the event sequence. The at least one hardware processor is further configured, in response to receiving the indication, to select a parameter value from a plurality of parameter values according to the target client system, and to instantiate a behavior model with the parameter value, the behavior model configured to input a selected event of the event sequence and in response, to produce a prediction indicator indicative of a likelihood that the event sequence includes the target event. The at least one hardware processor is further configured, in response to instantiating the behavior model, to determine whether the target event is indicative of a computer security threat according to the prediction indicator. The plurality of parameter values are determined according to a training corpus of events having occurred on a plurality of client systems grouped into a plurality of client clusters. Each of the plurality of parameter values is determined according to a distinct subset of the training corpus, each distinct subset having occurred on members of a distinct cluster of a plurality of client clusters. Selecting the parameter value comprises selecting a target cluster from the plurality of client clusters according to the target client system, and selecting the parameter value according to the target cluster.

According to another aspect, a computer-implemented method comprises, in response to receiving an indication of an occurrence of a target event on a target client system, employing at least one hardware processor of a computer system to assemble an event sequence including the target event, all events of the event sequence having occurred on the target client system, wherein members of the event sequence are arranged according to a time of occurrence of each event of the event sequence. The method further comprises, in response to receiving the indication, employing at least one processor of the computer system to select a parameter value from a plurality of parameter values according to the target client system. The method further comprises, in response to selecting the set parameter value, employing at least one hardware processor of the computer system to instantiate a behavior model with the parameter value, the behavior model configured to input a selected event of the event sequence and in response, to produce a prediction indicator indicative of a likelihood that the event sequence includes the target event. The method further comprises, in response to instantiating the behavior model, employing at least one hardware processor of the computer system to determine whether the target event is indicative of a computer security threat according to the prediction indicator. The plurality of parameter values are determined according to a training corpus of events having occurred on a plurality of client systems grouped into a plurality of client clusters. Each of the plurality of parameter values is determined according to a distinct subset of the training corpus, each distinct subset having occurred on members of a distinct cluster of a plurality of client clusters. Selecting the parameter value comprises selecting a target cluster from the plurality of client clusters according to the target client system, and selecting the parameter value according to the target cluster.

According to another aspect, a non-transitory computer-readable medium stores instructions which, when executed by at least one hardware processor of a computer system, cause the computer system, in response to receiving an indication of an occurrence of a target event on a target client system, to assemble an event sequence including the target event, all events of the event sequence having occurred on the target client system, wherein members of the event sequence are arranged according to a time of occurrence of each event of the event sequence. The instructions further cause the computer system, in response to receiving the indication, to select a parameter value from a plurality of parameter values according to the target client system, and in response selecting the parameter value, to instantiate a behavior model with the parameter value, the behavior model configured to input a selected event of the event sequence and in response, to produce a prediction indicator indicative of a likelihood that the event sequence includes the target event. The instructions further cause the computer system, in response to instantiating the behavior model, to determine whether the target event is indicative of a computer security threat according to the prediction indicator. The plurality of parameter values are determined according to a training corpus of events having occurred on a plurality of client systems grouped into a plurality of client clusters. Each of the plurality of parameter values is determined according to a distinct subset of the training corpus, each distinct subset having occurred on members of a distinct cluster of a plurality of client clusters. Selecting the parameter value comprises selecting a target cluster from the plurality of client clusters according to the target client system, and selecting the parameter value according to the target cluster.

BRIEF DESCRIPTION OF THE DRAWINGS

The foregoing aspects and advantages of the present invention will become better understood upon reading the following detailed description and upon reference to the drawings where:

FIG. 3-A illustrates an exemplary hardware configuration of a client system according to some embodiments of the present invention.

FIG. 3-B illustrates an exemplary hardware configuration of a security server according to some embodiments of the present invention.

FIG. 8-A shows an exemplary training of an event encoder according to some embodiments of the present invention.

FIG. 8-B shows an alternative exemplary training of the event encoder according to some embodiments of the present invention.

FIG. 17-A shows results of an experiment comprising employing some embodiments of the present invention to detect actual computer security threats.

FIG. 17-B shows other experimental results of using some embodiments to detect actual computer security threats.

DETAILED DESCRIPTION OF PREFERRED EMBODIMENTS

In the following description, it is understood that all recited connections between structures can be direct operative connections or indirect operative connections through intermediary structures. A set of elements includes one or more elements. Any recitation of an element is understood to refer to at least one element. A plurality of elements includes at least two elements. Unless otherwise specified, any use of "OR" refers to a non-exclusive or. Unless otherwise required, any described method steps need not be necessarily performed in a particular illustrated order. A first element (e.g. data) derived from a second element encompasses a first element equal to the second element, as well as a first element generated by processing the second element and optionally other data. Making a determination or decision according to a parameter encompasses making the determination or decision according to the parameter and optionally according to other data. Unless otherwise specified, an indicator of some quantity/data may be the quantity/data itself, or an indicator different from the quantity/data itself. A computer program is a sequence of processor instructions carrying out a task. Computer programs described in some embodiments of the present invention may be stand-alone software entities or sub-entities (e.g., subroutines, libraries) of other computer programs. Unless otherwise specified, computer security encompasses protecting equipment and data against illegitimate access, modification, and/or destruction. Computer readable media encompass non-transitory media such as magnetic, optic, and semiconductor storage media (e.g. hard drives, optical disks, flash memory, DRAM), as well as communication links such as conductive cables and fiber optic links. According to some embodiments, the present invention provides, inter alia, computer systems comprising hardware (e.g. one or more processors) programmed to perform the methods described herein, as well as computer-readable media encoding instructions to perform the methods described herein.

The following description illustrates embodiments of the invention by way of example and not necessarily by way of limitation.

Figure 1:
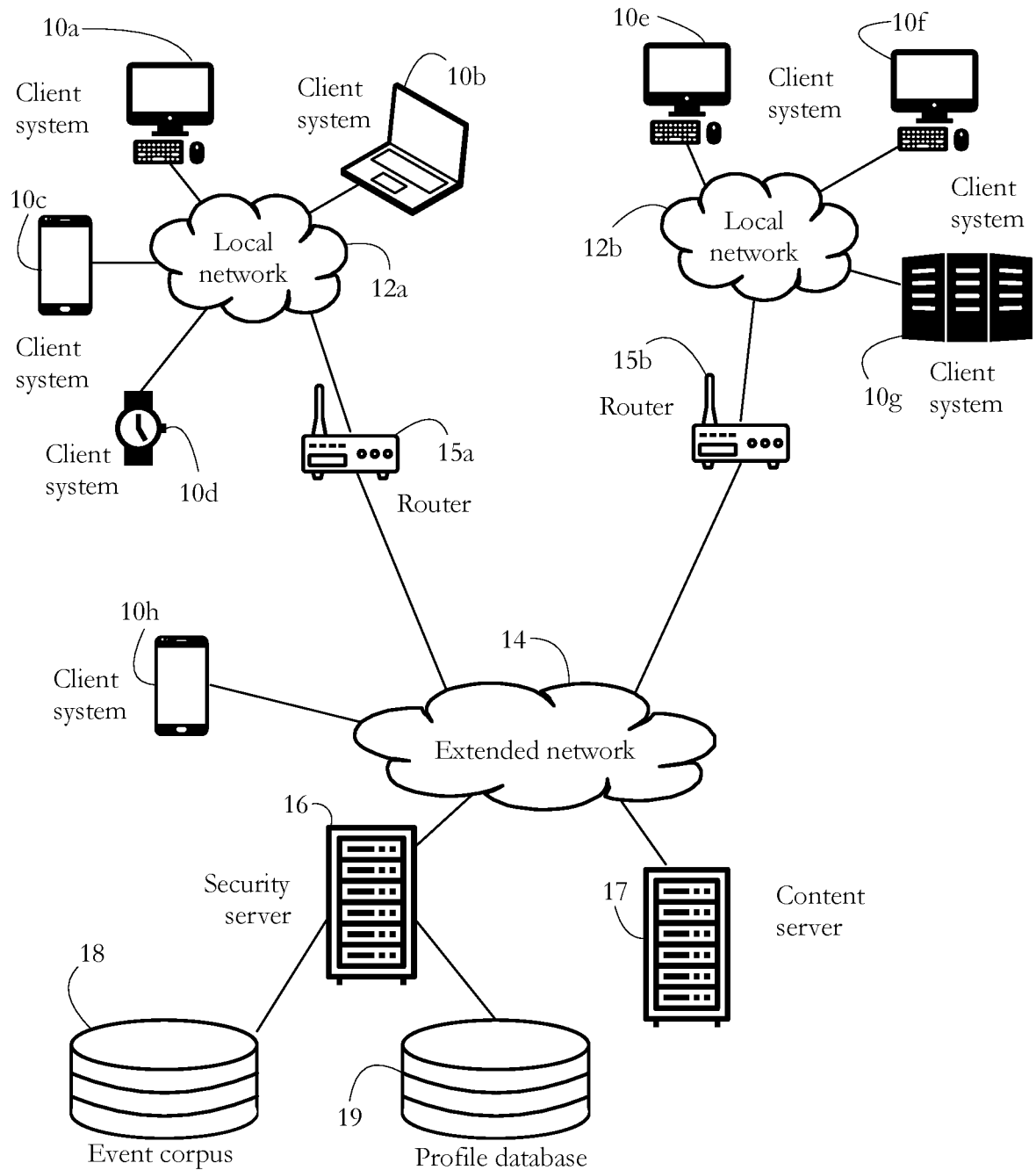
FIG. 1 shows several exemplary interconnected client systems, with a security server acting as intrusion detection system according to some embodiments of the present invention.

FIG. 1 shows an exemplary set of client systems 10a-h protected from computer security threats according to some embodiments of the present invention. Client systems 10a-h generically represent any electronic device having a processor, a memory, and a communication interface. Exemplary client systems 10a-h include personal computers, laptops, tablet computers, mobile telecommunication devices (e.g., smartphones), media players, TVs, game consoles, home appliances (e.g., refrigerators, intelligent heating and/or lighting systems), and wearable devices (e.g., smartwatches, fitness equipment), among others. Client systems 10a-h may execute various software, e.g., document processing, gaming, electronic messaging, and social media applications, among others. Some clients may exchange information with a remote content server 17, for instance, Internet browsing.

The illustrated client systems are connected by local networks 12a-b, and further to an extended network 14, such as a wide area network (WAN) or the Internet. In one example, client systems 10a-d represent a family's electronic devices, interconnected by a home network 12a. Meanwhile, client systems 10e-g may denote individual computers and/or a corporate mainframe inside an office building. Local network 12-b may then represent a section of a corporate network (e.g., a local area network—LAN).

A router comprises an electronic appliance enabling communication between multiple client systems and/or access of the respective clients to extended network 14. In the example of FIG. 1, routers 15a-b interconnect clients on local networks 12a-b and/or enable clients 10a-g to access the Internet. Routers 15a-b may act as gateways between local networks 12a-b, respectively, and extended network 14 and may further provide a set of network services to client systems 10a-g. Such services include, for instance, distributing network configuration parameters to client systems 10a-g (e.g., assigning network addresses via Dynamic Host Configuration Protocol—DHCP), and routing communications through a sequence of network nodes. Some client systems, such as exemplary client system 10h, may connect directly to extended network 14, for instance via a telecommunication relay.

FIG. 1 further shows a security server 16 connected to extended network 14. Server 16 generically represents a set of communicatively coupled computer systems, which may or may not be in physical proximity to each other. Server 16 protects client systems 10a-h against computer security threats such as malicious software and intrusion. In some embodiments, such protection comprises security server 16 detecting suspicious activity occurring at a client system, for instance an action of an attacker controlling the respective client system.

Figure 2:
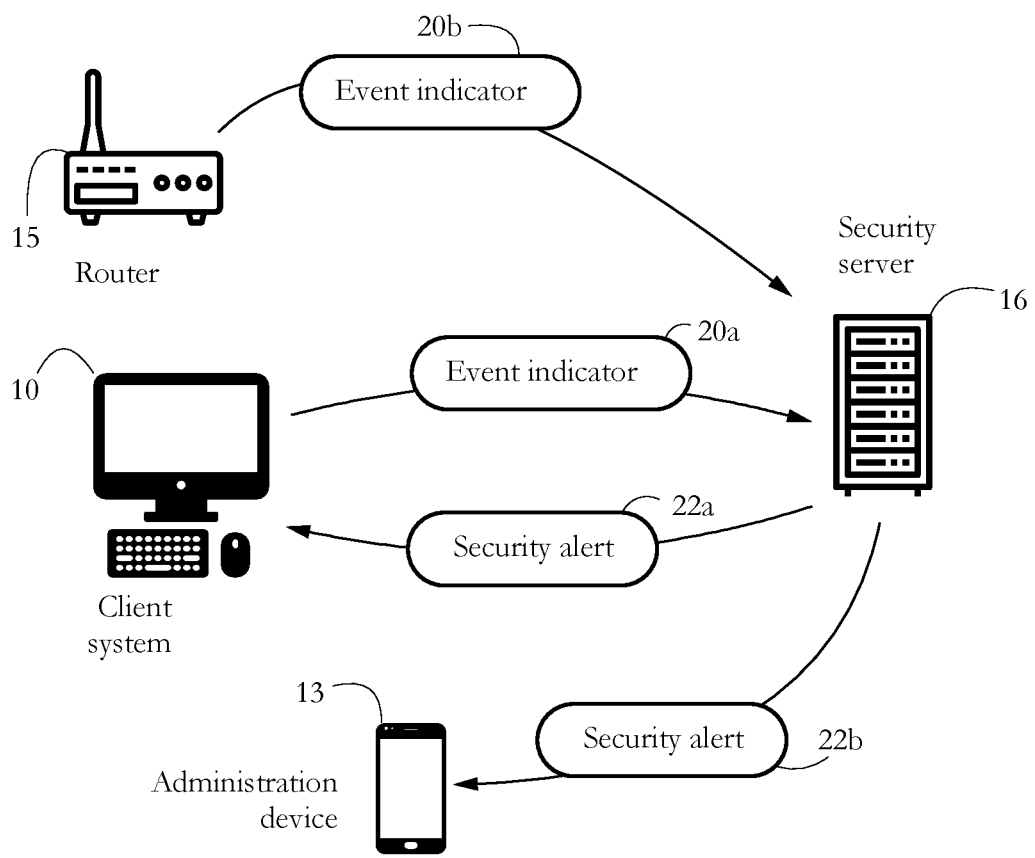
FIG. 2 shows an exemplary data exchange carried out to protect a client system according to some embodiments of the present invention.

An exemplary data exchange between security server 16 and a client system 10 is illustrated in FIG. 2. Client system 10 may represent any client 10a-h in FIG. 1. In some embodiments, server 16 is configured to receive an event indicator 20a from client system 10, indicator 20a indicative of the occurrence of a particular type of event during execution of software on client 10. Examples of such events include the launch of a process/thread (e.g., a user launches an application, a parent process creates a child process, etc.), an attempt to access an input device of the respective client system (e.g., camera, microphone), an attempt to access a local or remote network resource (e.g., a hypertext transfer protocol—HTTP request to access a particular URL, an attempt to access a document repository over a local network), a request formulated in a particular uniform resource identifier scheme (e.g., a mailto: or a ftp: request), an execution of a particular processor instruction (e.g., system call), an attempt to load a library (e.g., a dynamic linked library—DLL), an attempt to create a new disk file, an attempt to read from or write to a particular location on disk (e.g., an attempt to overwrite an existing file, an attempt to open a specific folder or document), and an attempt to send an electronic message (e.g., email, short message service—SMS, etc.), among others. In some embodiments, periods of inactivity, i.e., time gaps between events and/or time intervals when the respective client system is idle, registers no user activity, or carries out only internal system tasks, also qualify as events and may be reported via event indicators to the security server. Such inactive periods may be further differentiated into short time gaps (e.g., of the order of a seconds) and long time gaps (e.g., of the order of minutes to hours). Detected events may or may not be indicative of malice per se; some events may be malice-indicative when occurring together with other events and/or when occurring in a particular sequence. Other events may be malicious when they occur at certain times of the day or with an unusual frequency, for instance a sequence of 1000 reads from a particular disk folder in an interval of a few seconds.

Each event indicator 20a may comprise, among others, an indicator of a type of the respective event and a timestamp indicative of a moment in time when the respective event has occurred. Event indicator 20a may further include an identifier (client ID) of the respective client system and/or an indicator of a user (user ID) currently operating the respective client system. For instance, when the communicated event comprises a process creation, a user indicator may indicate the owner of the parent process. Event indicator 20a may encode other parameters such as a process name, a file system location/path of a process being launched, a network address (e.g., Internet protocol—IP address), a universal resource locator (URL) of an HTTP request, etc.

In some embodiments, server 16 may also harvest information from routers 15a-b, as illustrated by an event indicator 20b in FIG. 2. Such event indicators may include, for instance, indicators of network events such as network access requests issued by client systems connected to the respective router/gateway. For instance, event indicator 20b may include an originating IP address, a destination IP address, a timestamp, and a payload size. In some embodiments, event indicator 20b comprises client event data aggregated by the respective router according to various data processing protocols (e.g., network flows, network logs, etc.).

Security server 16 maintains a set of user behavior models representing a baseline, normal, and/or legitimate manner of operating a subset of client systems 10a-h. Such behavior models are herein deemed client profiles. Parameters of such behavior models are generically represented as profile database 19 in FIG. 1 and may include an output of an event and/or client clustering algorithm, as shown in detail below. In one exemplary embodiment wherein a profile is represented by a client or event cluster, parameters of the respective profile may include coordinates of a cluster centroid and a set of numbers indicating a range of the respective cluster along various axes. Other profile parameters may include, among others, an eccentricity measure of the respective cluster, and an average distance between cluster members and the cluster's centroid, among others. Client profiles may be generated automatically, using supervised or unsupervised learning methods and algorithms, as shown below.

A client profile may capture the behavior of a single user or may collectively capture the behavior of multiple users. To give some examples, a smartphone may be used primarily by a single user, therefore a client profile attached to the respective smartphone may essentially capture a baseline behavior of its primary user. In contrast, computers belonging to a university computer lab may be used by many different students; a client profile attached to one of these machines may collectively represent a baseline behavior of all the respective students. One client profile may be attached to a single client system/physical machine (e.g., smartphone, laptop). In some embodiments, one client profile may collectively represent a plurality of physical machines. In one such example, client systems 10a-d in FIG. 1 may be collectively represented by a single client profile which captures a normal or baseline behavior of the members of a particular family. In another example, one client profile is used to represent all computers in the accounting department of a corporation, while another client profile represents all computers used by the respective corporation's research and development team. In a cloud computing embodiment, such as a virtual desktop infrastructure (VDI) environment wherein a physical machine may execute a plurality of virtual machines for various distributed users, one client profile may be attached to multiple virtual machines executing on the respective physical machine.

In some embodiments, a single user may be represented by a plurality of distinct client profiles. For instance, the same person may have one client profile/baseline behavior while at work and a distinct client profile/baseline behavior while at home. Other examples of client profiles may be associated with users of a particular age group (e.g., teenagers), a particular personal interest (e.g., gaming), a particular occupation (e.g., engineer, artist, educator), etc. In yet another exemplary embodiment, distinct client profiles may correspond to distinct computer activities, e.g., to using distinct computer programs: browsing the Internet, using social media, doing office work, etc. Yet other exemplary client profiles may be attached to distinct device types (e.g., smartphone vs. PC). Collective profiles may be devised according to more complex criteria, for instance a client profile indicating a typical/baseline manner in which an engineer from company X browses the Internet. Another such exemplary profile may indicate a typical manner in which young people use tablet computers.

A subset of event indicators 20a-b may be collected to form an event corpus further used to derive client profiles as shown in detail below. Another subset of event indicators may be used to detect security threat. For instance, in response to receiving event indicators 20a-b, security server 16 may determine whether the event communicated by the respective event indicator is consistent with a client profile selected according to the respective client indicator. Stated otherwise, security server 16 may determine whether the respective event matches a pattern of normality/baseline behavior encoded in the respective client profile. When no, the respective event may indicate suspicious activity, in which case some embodiments may take protective action, for instance sending security alerts 22a-b to the respective client system and/or to an administrator of the respective client system. In another example of protective action, some embodiments instruct a router which belongs to the same local network as the suspect client system to block communications to and/or from the respective suspect client system. Client profiles and processing of event indicators by security server 16 are further described below.

FIG. 3-A shows an exemplary hardware configuration of a client system according to some embodiments of the present invention. Client system 10 may represent any of client systems 10a-h in FIG. 1. For clarity, the illustrated client system is a computer system. Other client systems such as mobile telephones, tablet computers, and wearable devices may have slightly different configurations. Processor 32 comprises a physical device (e.g. microprocessor, multi-core integrated circuit formed on a semiconductor substrate) configured to execute computational and/or logical operations with a set of signals and/or data. Such signals or data may be encoded and delivered to processor 32 in the form of processor instructions, e.g., machine code. Memory unit 34 may comprise volatile computer-readable media (e.g. dynamic random-access memory—DRAM) storing data/signals accessed or generated by processor 32 in the course of carrying out operations.

Input devices 36 may include computer keyboards, mice, and microphones, among others, including the respective hardware interfaces and/or adapters allowing a user to introduce data and/or instructions into client system 10. Output devices 38 may include display devices such as monitors and speakers among others, as well as hardware interfaces/adapters such as graphic cards, enabling the respective client system to communicate data to a user. In some embodiments, input and output devices 36-38 share a common piece of hardware (e.g., a touch screen). Storage devices 42 include computer-readable media enabling the non-volatile storage, reading, and writing of software instructions and/or data. Exemplary storage devices include magnetic and optical disks and flash memory devices, as well as removable media such as CD and/or DVD disks and drives. Network adapter(s) 44 enable client system 10 to connect to an electronic communication network (e.g., networks 12, 14 in FIG. 1) and/or to other devices/computer systems.

Controller hub 40 generically represents the plurality of system, peripheral, and/or chipset buses, and/or all other circuitry enabling the communication between processor 32 and the rest of the hardware components of client system 10. For instance, controller hub 40 may comprise a memory controller, an input/output (I/O) controller, and an interrupt controller. Depending on hardware manufacturer, some such controllers may be incorporated into a single integrated circuit, and/or may be integrated with the processor. In another example, controller hub 40 may comprise a northbridge connecting processor 32 to memory 34, and/or a southbridge connecting processor 32 to devices 36, 38, 42, and 44.

FIG. 3-B shows an exemplary hardware configuration of security server 16 according to some embodiments of the present invention. Server 16 comprises at least one hardware processor 132 (e.g., microprocessor, multi-core integrated circuit), a physical memory 134 (e.g., DRAM), server storage devices 142, and a set of server network adapters 144. Server processors 132 may include a central processing unit (CPU) and/or an array of graphics processing units (GPU). Adapters 144 may include network cards and other communication interfaces enabling security server 16 to connect to communication network 14. Server storage devices 142 may store data such as event indicators and/or client profile parameters. In some embodiments, server 16 further comprises input and output devices, which may be similar in function to input/output devices 36 and 38 of client system 10, respectively.

Figure 4:
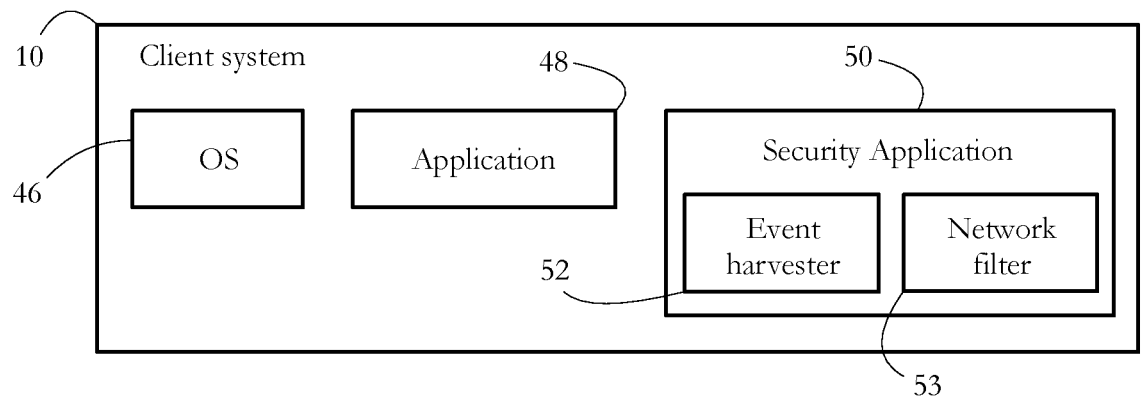
FIG. 4 shows exemplary software components executing on a protected client system according to some embodiments of the present invention.

FIG. 4 shows exemplary software components executing on client system 10 according to some embodiments of the present invention. Such software may include an operating system (OS) 46 providing an interface between the hardware of client system 10 and other computer programs such as a user application 48 executing on the respective client system. Exemplary operating systems include, among others, Windows®, MacOS®, iOS®, and Android®. User application 48 generically represents any application such as word processing, image processing, spreadsheet, calendar, online games, social media, web browser, and electronic communication applications, among others. In some embodiments, a security application 50 is configured to protect client system 10 against computer security threats such as malicious software and intrusion. Among other functions, security application 50 is configured to transmit event indicators to security server 16 and/or to receive security alerts. In some embodiments, application 50 further comprises an event harvester 52 and a network filter 53. Some functionality of network filter 53 may be implemented directly in hardware. When client system 10 operates a hardware virtualization platform wherein OS 46 and application 48 execute within a virtual machine (for instance, in a cloud computing environment), event harvester 52 and/or network filter 53 may execute outside the respective virtual machine, e.g., at a level of a hypervisor exposing the respective virtual machine, using techniques known in the art as introspection.

tocol, and a size of a data packet. Other exemplary metadata may include an indicator of a type of hypertext transfer protocol (HTTP) user agent to transmitting the respective communication/data packet. Some embodiments organize communication metadata into specialized data structures, known in the art as network flows (for instance, NetFlow® from Cisco Systems, Inc.). Table 1 shows examples of communication metadata represented as flows according to some embodiments of the present invention.

TABLE 1

| Flow # | Destination address | port | Source address | port | Protocol | Number of bytes | Number of packets | TCP Flags |
|---|---|---|---|---|---|---|---|---|
| 1 | 10.10.12.71 | 443 | 192.168.127.10 | 54321 | TCP | 12300 | 21 | SA |
| 2 | 192.168.127.10 | 54321 | 10.10.12.71 | 443 | TCP | 2156980 | 413 | FSPA |

Event harvester 52 is configured to detect various events occurring during execution of software by client system 10. Some embodiments may timestamp each detected event to record a time of occurrence of the respective event. Monitored events may be machine and/or operating system-specific. Exemplary events include, among others, a process launch, a process termination, the spawning of child processes, an access requests to peripherals (e.g., hard disk, network adapter), a command entered by the user into a command-line interface, etc. Such hardware and/or software events may be detected using any method known in the art of computer security, for instance by hooking certain functions of the operating system, detecting system calls, employing a file system minifilter, changing a memory access permission to detect an attempt to execute code from certain memory addresses, etc.

Some embodiments monitor hardware and/or software events using system logging tools built into OS 46 (e.g., Syslog in UNIX®). Such tools may generate a list of event descriptors including a timestamp for each event, a numerical code identifying an event type, an indicator of a type of process or application that generated the respective event, and other event parameters. Security application 50 may extract such information from the respective system log to formulate event indicators. Exemplary syslog entries are given below:
<30>Feb 8 21:36:51 dtm charon: 12[IKE] establishing CHILD SA dtmhg5{5}
<30>Feb 8 21:36:51 dtm charon: 12[IKE] establishing CHILD SA dtmhg5{5}
<187>Feb 8 21:37:56 example.domain.biz dhcpd: DHCP-DISCOVER from Oc:14:7b:11:14:64 via eth1: network eth1: no free leases Network filter 53 detects a set of network events occurring during electronic communications over networks 12-14 between client system 10 and other parties. Exemplary events detected by network filter 53 include events forming part of establishing a connection between client system 10 and another network entity (e.g., requesting a network address, transmitting a network address, handshake events, etc.), events that configure an encrypted connection (secure socket layer—SSL, virtual private network—VPN), transmitting data, and receiving data, among others. In some embodiments, network filter 53 collects metadata from intercepted network traffic. Such metadata may include, for instance, an originating network address (e.g., internet protocol—IP address), a destination address, a timestamp of a data packet, an indicator of a type of communication pro- In some embodiments, security application 50 formulates event indicators according to hardware, software, and/or network events detected by harvester 52 and network filter 53. Application 50 may further manage communication with security server 16, to transmit event indicators and/or receive security notifications, among others.

In an alternative embodiment, instead of processing network communication at the client as shown above, network filter 53 and/or router 15 may be configured to re-route to security server 16 at least a part of electronic communications going in and/or out of client system 10. For instance, the network configuration parameters of client system 10 may be set to indicate server 16 as the default network gateway. Some embodiments then employ security server 16 to extract event indicators from the respective re-routed traffic.

Figure 5:
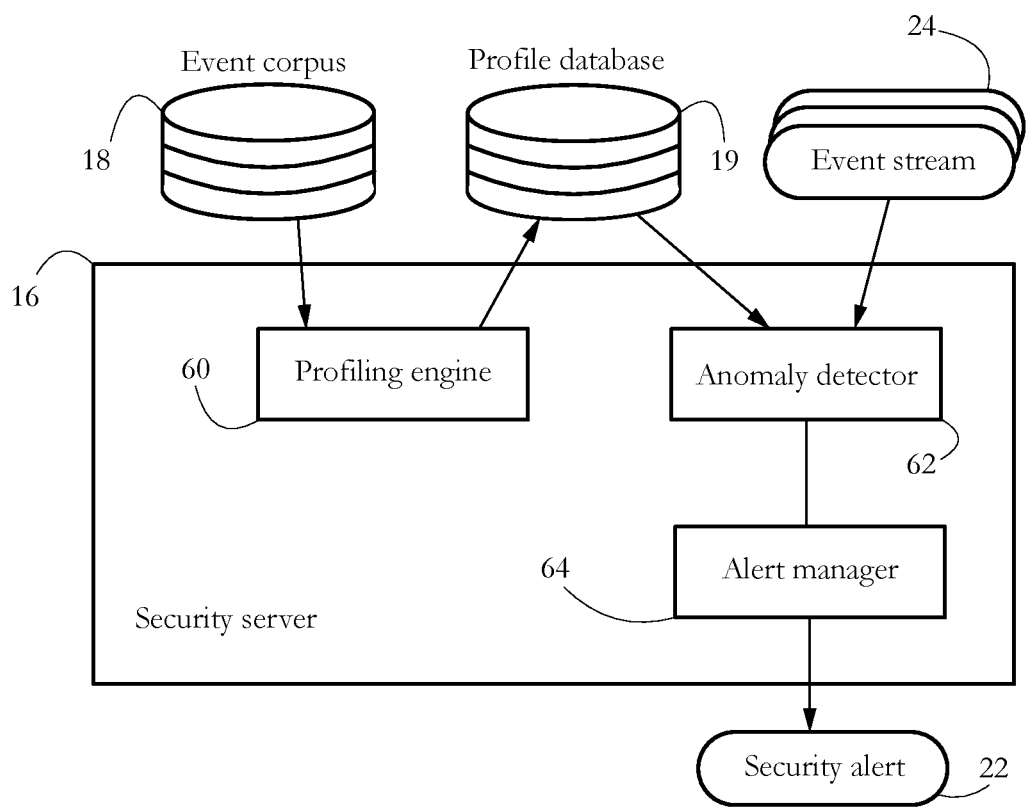
FIG. 5 shows an exemplary software architecture of a security server according to some embodiments of the present invention.

FIG. 5 shows exemplary software executing on security server 16 according to some embodiments of the present invention. The illustrated software includes a profiling engine 60 and an anomaly detector 62 further connected to an alert manager 64. A skilled artisan will appreciate that not all illustrated components need to execute on the same machine/processor; for instance, profiling engine 60 may execute on a dedicated cluster of processors, while instances of anomaly detector 62 may run on other machines/processors.

In some embodiments, profiling engine 60 is configured to analyze events occurring on a set of client systems (e.g., a subset of clients 10a-h in FIG. 1) and to construct a plurality of client profiles representing a baseline, normal, and/or legitimate manner of operating the respective client systems. A subset of event indicators 20a-b received from clients may be used to assemble a training event corpus, denoted as corpus 18 in FIGS. 1, 5, and 6. Profiles are then determined according to event corpus 18. Determining a client profile may include, among others, representing events in an abstract multi-dimensional event space and carrying out data clustering procedures, as shown in more detail below. Constructed profiles may then be stored as entries in profile database 19. An exemplary profile database entry comprises a set of profile parameters such as a set of coordinates of a cluster centroid, a measure of the cluster's diameter and/or eccentricity, etc.

Figure 6:
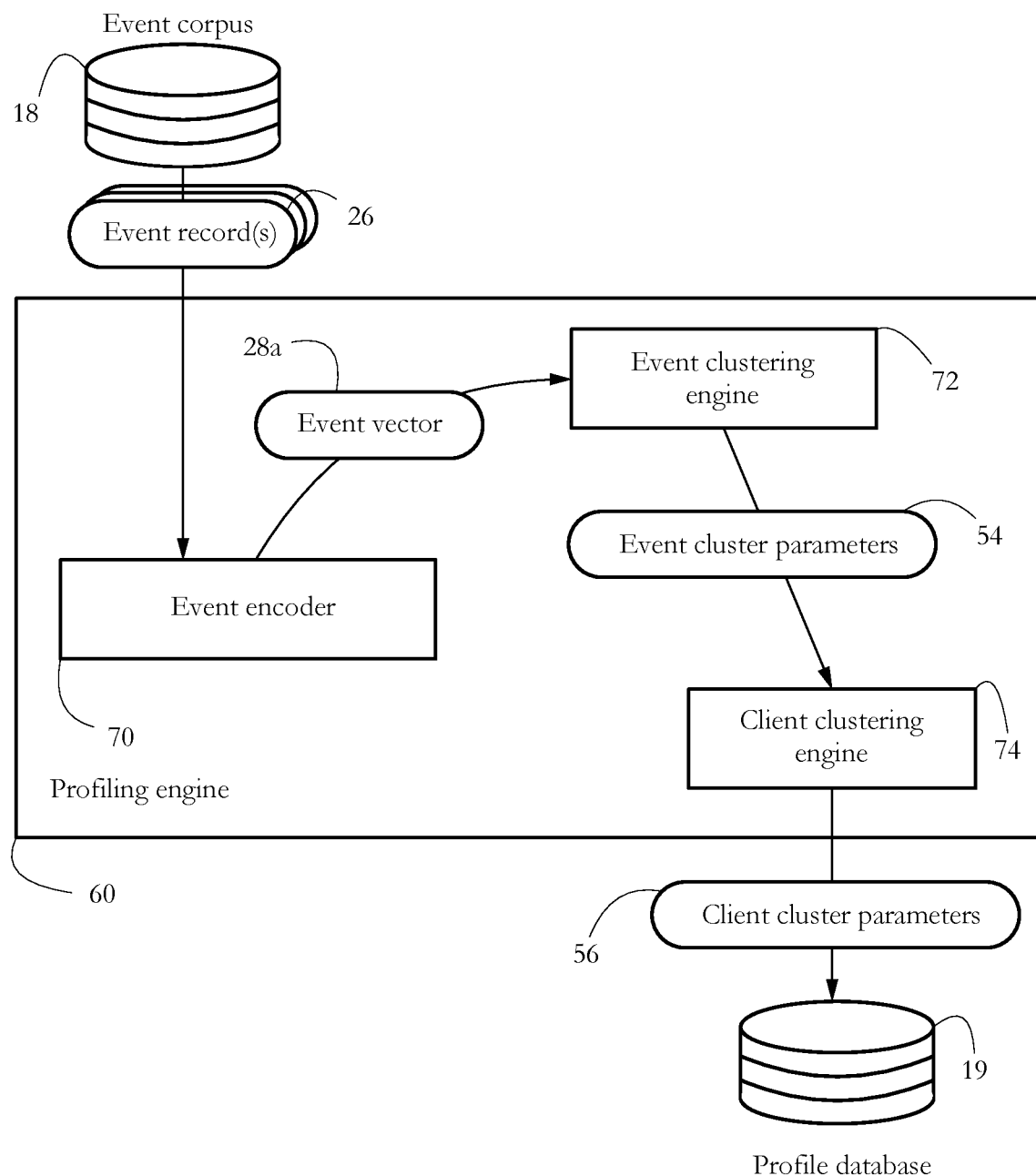
FIG. 6 illustrates an exemplary operation of a profiling engine according to some embodiments of the present invention.
Figure 7:
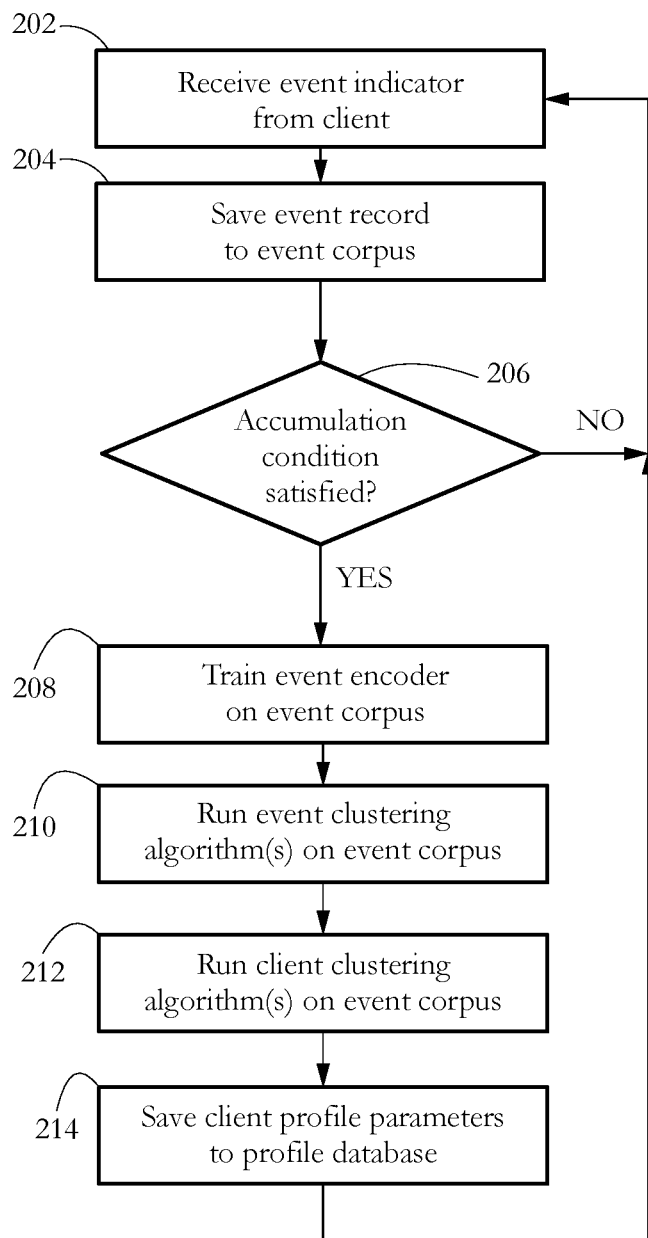
FIG. 7 shows an exemplary sequence of steps carried out by the profiling engine according to some embodiments of the present invention.

FIG. 6 illustrates exemplary components and operation of profiling engine 60. In some embodiments, engine 60 comprises an event encoder 70, an event clustering engine 72, and a client clustering engine 74 connected to event encoder 70 and event clustering engine 72. An exemplary sequence of steps performed by profiling engine is illustrated in FIG. 7.

In a sequence of steps 202-204-206, profiling engine 60 may assemble training event corpus 18 according to event indicators received from selected client systems and/or router(s). Some embodiments accumulate events indicators until some accumulation condition is satisfied. Accumulation conditions may be determined according to a count of events (gather a corpus of 1 million events), according to a time condition (e.g., record all events received within a 1 h interval, etc.), according to an identity of a client system and/or user (e.g., record all events received from corporation X, IP range Y, subscription account Z, etc.), or according to any other method known in the art. Individual events may be labeled according to their origin and may comprise a timestamp characterizing a moment in time when the respective even has occurred, or has been detected, or has been received at security server 16, etc. In some embodiments, event corpus 18 is refreshed periodically and/or on demand by incorporation of newly received event indicators.

In some embodiments, event encoder 70 (FIG. 6) is configured to input an event record 26 comprising data characterizing an event that has occurred on a client system (e.g., the launch of a process on a client machine), and in response, to output an event vector 28a comprising a representation of the respective event as a vector in an abstract multi-dimensional space usually deemed embedding space in the art. An exemplary embedding space is spanned by a set of axes, wherein each axis represents a distinct event feature. Exemplary features may include, in the case of a network event, a source IP address, a source port, a destination IP address, a destination port, and an indicator of the transport protocol, among others. In another example, each axis of the embedding space corresponds to a linear combination of event features (for instance, in a principal component/singular value decomposition embodiment). In preferred embodiments, events are analyzed in the context of other events, which precede and/or follow the respective event. In such cases, encoder 70 is configured to represent events as vectors in an embedding space of contexts, wherein two events that occur predominantly in similar contexts are located relatively close together. Some embodiments choose the dimensionality of the embedding space according to a size of the event vocabulary N, i.e., the count of distinct event types that the respective security system is monitoring (for more on the event vocabulary, see below). For instance, the dimensionality of the event space may of the order of the quadratic root of N, or of a logarithm of N. A typical embodiment of the present invention uses an embedding context space having several hundred to several thousand dimensions.

Event encoder 70 may be constructed using any method known in the art of automated data processing. In a preferred embodiment, encoder 70 comprises an artificial intelligence system, for instance a multilayer artificial neural network (e.g., a recurrent and/or feed-forward neural network). To achieve the desired representation of event vectors, parameters of encoder 70 may be tuned until some performance condition is satisfied. Such tuning is herein referred to as training and is represented by step 208 in FIG. 7. In a neural network embodiment, exemplary tunable parameters of event encoder 70 include a set of synapse weights, among others. In some embodiments, training encoder 70 amounts to constructing the embedding space itself. Stated otherwise, the embedding space is not pre-determined, but instead depends on the composition of event corpus 18 and on the selected training procedure.

Exemplary training procedures are shown in FIGS. 8-A-B and comprise versions of the word2vec algorithm, such as a skip-gram algorithm and a continuous bag-of-words algorithm. In such embodiments, events are not analyzed in isolation, but as constituents of an event sequence 25 consisting of multiple events ordered according to a time of occurrence or detection. In some embodiments, all events of the respective sequence are selected so that they occur on the same client system. Event sequence 25 comprises a central event $E_0$ and an event context consisting of a subset of events $E_{-k} \ldots E_{-1}$ (k≥0) preceding the central event and/or a subset of events $E_1 \ldots E_p$ (p≥0) following the central event. Typical embodiments use a symmetric event context (p=k), with p in the range of 2 to 5. Each individual event $E_1$ (−k≤i≤p) may be represented as an N-by-1 vector of numbers, wherein each line represents a distinct event type (e.g., launching a browser, initiating a file download, writing data to disk, etc.), N represents a size of a "vocabulary" of event types, and a non-zero element indicates that the respective event is of the respective event type. Such a representation is commonly known in the art as a 1-hot encoding. An exemplary size N of the event vocabulary ranges from several hundred to several thousands of distinct event types, but can go up to several million for specific applications. A skilled artisan will appreciate that the one-hot encoding is herein used only as an example, and by no means limits the scope of the present invention.

In the exemplary training procedures, an event encoder is paired and co-trained with an event decoder, both of which may comprise parts of a feed-forward and/or recurrent neural network. In general, the encoder-decoder pair may be configured to input a first subset of a training sequence (e.g., central event $E_0$) and to output a "prediction" for a second subset of the respective sequence (e.g., some context event $E_i$, i≠0). In the examples of FIGS. 8-A-B, the predictions are illustrated as one-hot vectors; alternative embodiments may use a different representation. For instance, a prediction may be represented as a N-dimensional vector of numbers, each number indicating a likelihood that a corresponding event type is present in the second subset.

In a skip-gram training procedure illustrated in FIGS. 8-A, the encoder-decoder pair is trained to produce the correct event context given the central event $E_0$. For each sequence of events drawn from event corpus 18, an encoder 70a is configured to input a one-hot encoding of central event $E_0$ and to produce event vector 28c comprising a representation of central event $E_0$ in the embedding context space. In turn, a decoder 76a is configured to input event vector 28c and output a plurality of guessed vectors, each representing a "predicted" context event $E_i$ (i≠0) of the respective event sequence. The encoder-decoder pair may then be trained by adjusting parameters of encoder 70a and/or decoder 76a in an effort to reduce the prediction error, i.e., to correct a mismatch between the "predicted" context and the actual context of the respective training sequences.

An alternative training procedure using a continuous bag-of-words training algorithm and aims to produce the correct central event $E_0$ of a training sequence given the respective event context. In one such example illustrated in FIG. 8-B, an event encoder 70b is configured to input a set of one-hot vectors representing context events $E_i$ (i≠0) of sequence 25, and to output embedded event vectors 28d-f determined for each respective context event. In contrast to the skip-gram embodiment illustrated in FIG. 8-A, encoder 70b is now paired with an event decoder 76b configured to input the plurality of event vectors 28d-f, and to produce a prediction or "guess" for the central event $E_0$ of sequence 25. The encoder-decoder pair may then be trained by adjusting parameters of encoder 70b and/or decoder 76b in an effort to reduce the prediction error, i.e., the mismatch between the "predicted" central event and the actual central event of the respective training sequences.

Figure 9:
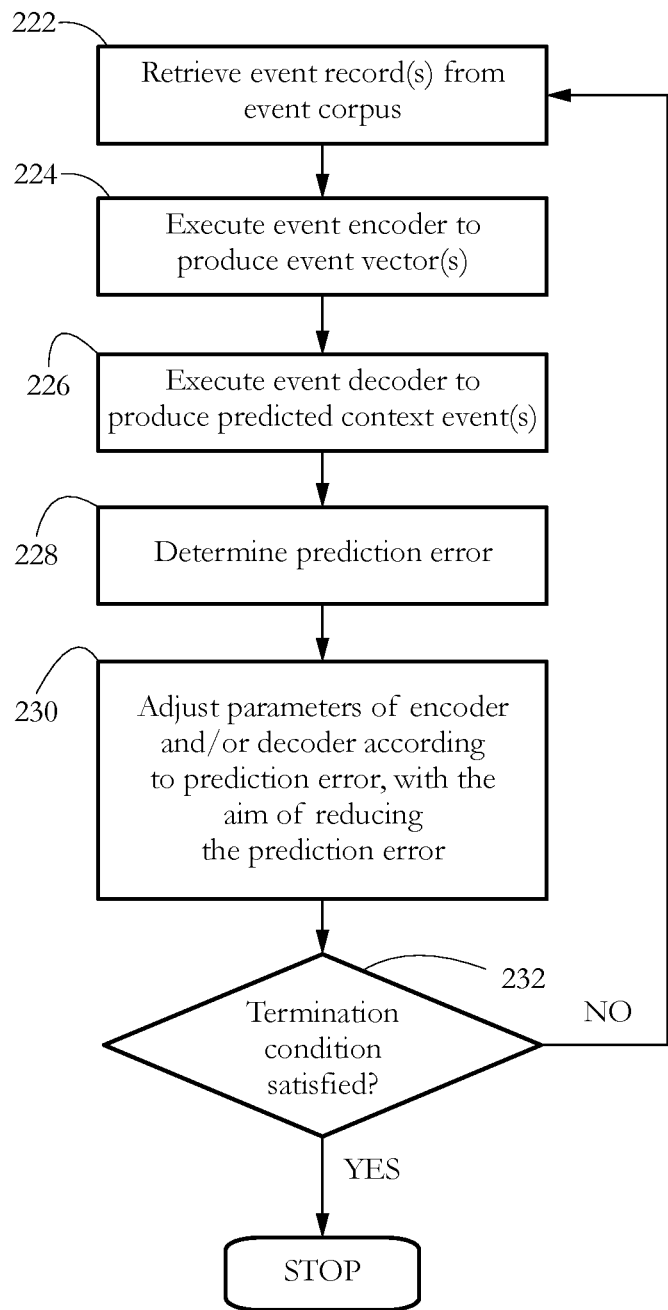
FIG. 9 shows an exemplary sequence of steps performed to train the event decoder in the configuration of FIG. 8-A.

An exemplary sequence of steps implementing training of an event encoder is illustrated in FIG. 9. A step 222 retrieves a set of event records from event corpus 18 and identifies an event sequence 25 according to event timestamps and according to a source of the respective events (i.e., client systems where the respective events have occurred). In a skip-gram embodiment, a step 224 then executes event encoder 70a to produce an embedding-space representation of event $E_0$ (event vector 28c in FIG. 8-A). In a step 226, profiling engine 60 executes event decoder 76a to produce a set of predictions or "guesses" for events preceding and/or following central event $E_0$ within sequence 25. A step 228 compares each predicted context event with the respective actual context event $E_i$ ($i \neq 0$) of sequence 25, thus determining a numerical prediction error. The prediction error, which may be interpreted as a cost function or an objective function, may be calculated according to any method known in the art of artificial intelligence. Such calculations may comprise determining a distance, for instance a Levenshtein, Euclidean, or cosine distance between the predicted and actual events. Some embodiments determine an objective function according to a cross entropy measure. In a step 230, profiling engine may adjust parameters of encoder 70a in the direction of minimizing the calculated prediction error. Some exemplary algorithms used for training include back-propagation using a gradient descent, simulated annealing, and genetic algorithms, among others. Some embodiments then repeat steps 222-230 until a termination condition is satisfied, for instance until the average prediction error over event corpus 18 drops below a pre-determined threshold. In another embodiment, training proceeds for a pre-determined amount of time, or for a pre-determined count of iterations. A skilled artisan will know that the sequence of steps illustrated in FIG. 9 is equally suited to a bag-of words embodiment (FIG. 8-B), with minor adaptations.

In response to training the event encoder as shown above, some embodiments further transform the generated embedding space to reduce its dimensionality. This operation may comprise any data dimensionality reduction algorithm, for instance a principal component analysis (PCA) or a singular value decomposition (SVD).

Following training and optional dimensionality reduction (step 208 in FIG. 7), event encoder 70 is capable of representing each event as a vector in a multidimensional embedding space of event contexts, wherein two events that occur frequently within the same event context occupy similar positions. Stated otherwise, two such events are separated in the embedding space by a distance smaller than the distance between two events which occur predominantly in different contexts.

Figure 10:
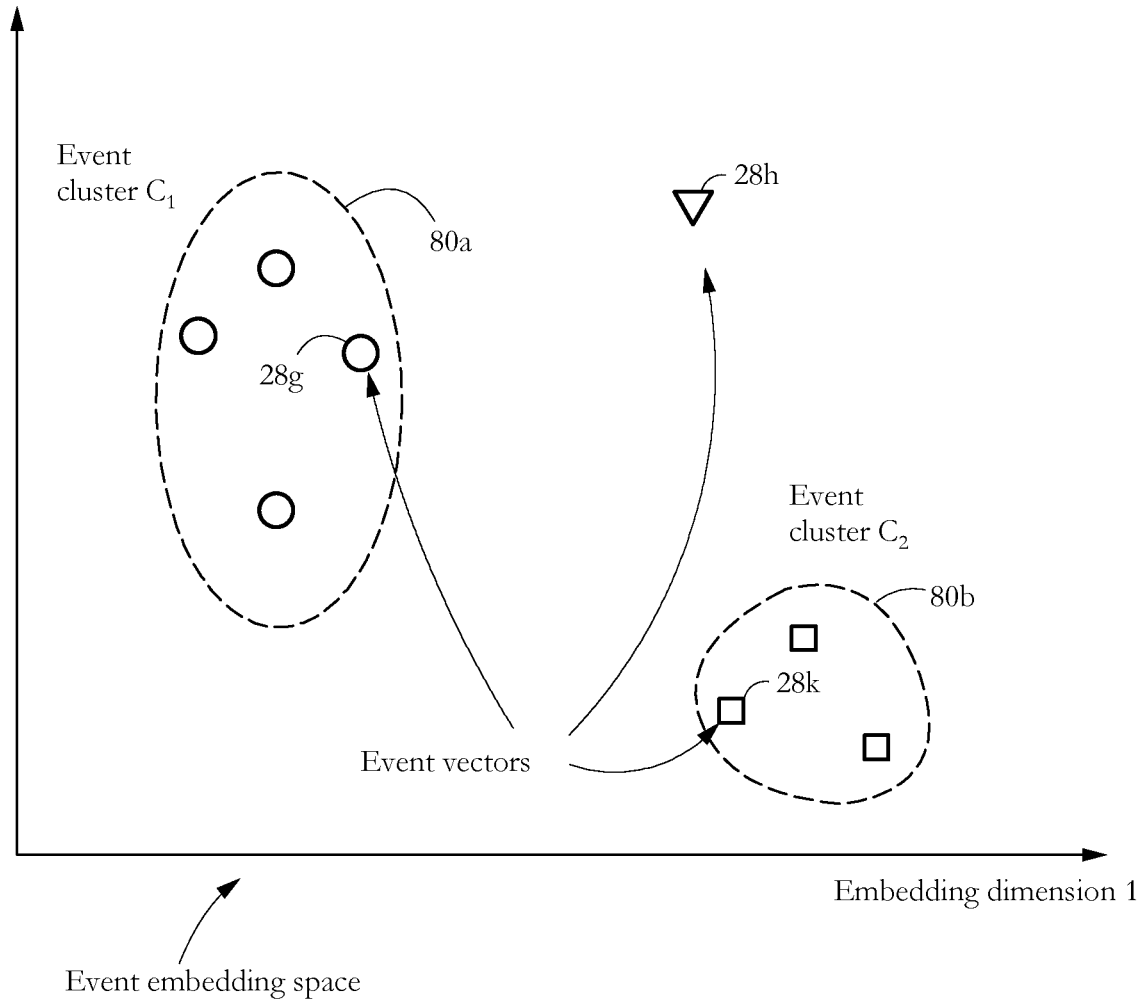
FIG. 10 illustrates an exemplary event embedding space and a set of exemplary event clusters according to some embodiments of the present invention.

Returning to components of profiling engine 60 (FIG. 6), event clustering engine 74 is configured to organize event vectors produced by trained event encoder 70 and representing members of training corpus 18, into clusters according to a position of each event vector within the embedding space (see also step 207 in FIG. 7). In some embodiments, a cluster comprises a plurality of events that are relatively close together in embedding space, or stated otherwise, a plurality of events characterized by a relatively small inter-event distance in embedding space. In an alternative embodiment, a cluster consists of events that occupy a cluster-specific region of embedding space. Such regions may be mutually exclusive or partially overlapping. FIG. 10 illustrates an exemplary embedding space and a set of event clusters 80a-b according to some embodiments of the present invention. The illustrated axes may comprise, for instance, the first and second principal components of the illustrated event vectors (vectors 28g-h-k). In an embodiment using an embedding space of event contexts, a cluster may selectively contain events which occur primarily within a similar event context. Furthermore, the same cluster may include events occurring on various client systems and/or representing the activity of various users.

To construct event clusters, profiling engine 60 may employ any data clustering algorithm known in the art, for instance a variant of a k-means algorithm. Another exemplary embodiment may train a set of perceptrons to carve the embedding space into distinct regions and assign event vectors located within each region to a distinct event cluster. The number of clusters and/or regions may be pre-determined (e.g., according to a count of protected client systems and/or monitored event types) or may be dynamically determined by the clustering algorithm itself. An outcome of event clustering comprises a set of event cluster parameters 54 (FIG. 6), which may include, for each cluster, the coordinates of the cluster's centroid and a measure of the cluster's extent, e.g., a diameter and/or eccentricity. Other exemplary cluster parameters 54 may include, among others, a list of members of the respective cluster, and a selected member of the respective cluster considered as representative/archetypal of the respective cluster. Cluster parameters may be passed on to client clustering engine 74.

Figure 11:
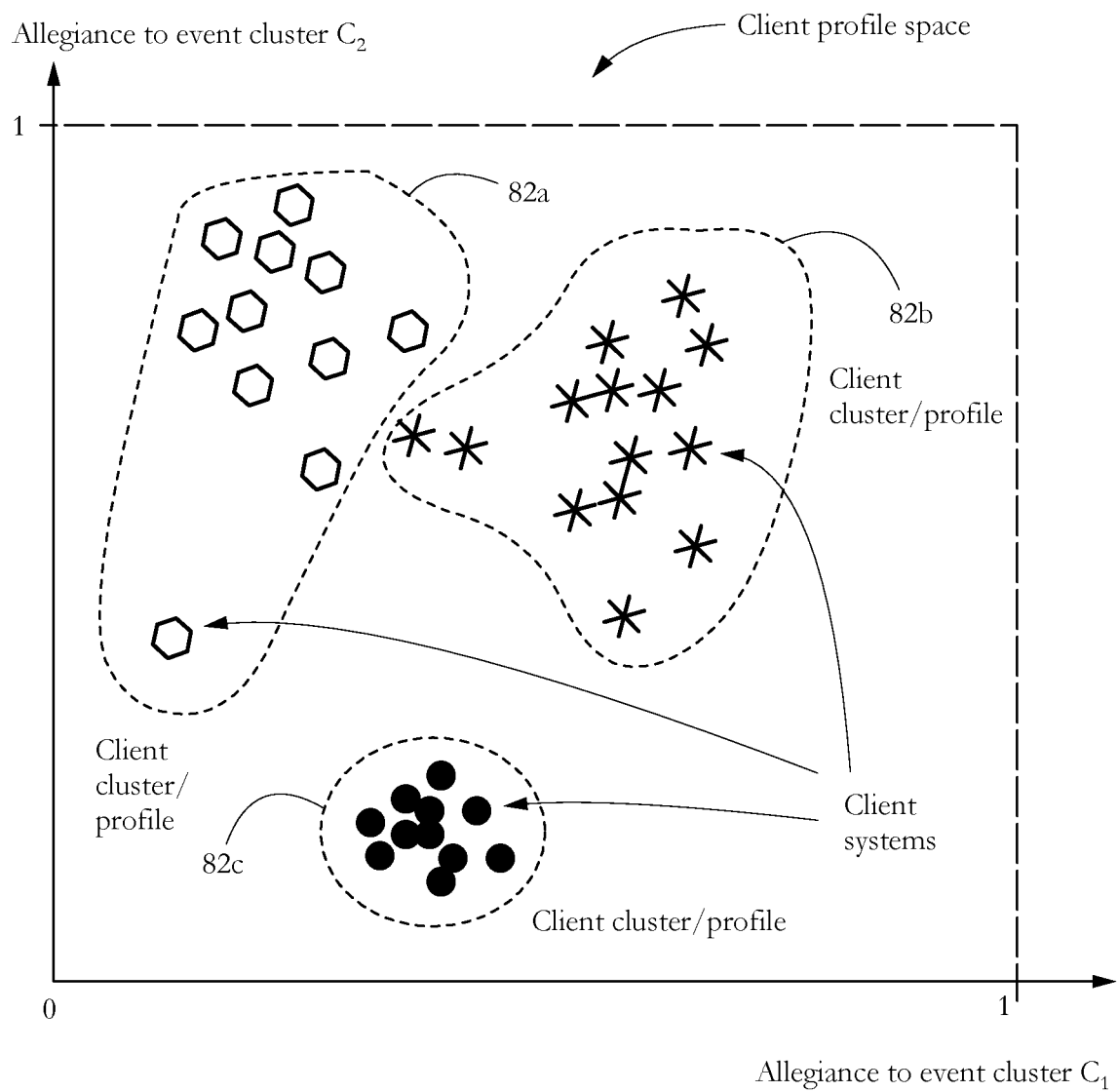
FIG. 11 illustrates an exemplary client profile space and a set of client clusters according to some embodiments of the present invention.

Client clustering engine 74 (FIG. 6) is configured to determine a set of client profiles according to event clusters computed by event clustering engine 72. Such client profiles are illustrated in FIG. 11. In some embodiments, each client profile comprises a selected subset (cluster) of the protected client systems 10a-h. Some client profiles may include multiple client clusters. In some embodiments, a client profile may comprise a profile archetype, which may be an actual member of the respective client cluster, or a fictional client system characterized by a specific position in profile space. For instance, a profile archetype may comprise a centroid of a client cluster determined by client clustering engine 74.

Figure 12:
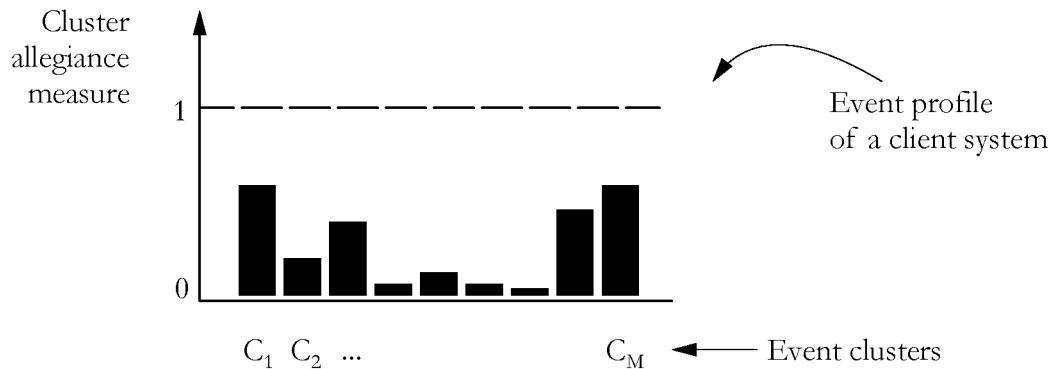
FIG. 12 shows an exemplary event profile of a client system according to some embodiments of the present invention.

To compute client profiles, some embodiments of client clustering engine 74 assign client systems 10a-h to clusters according to an event profile indicative of a typical distribution of events occurring on the respective client systems. In one exemplary embodiment, an event profile of a client system comprises a vector of numbers, each determined according to a count of events occurring on the respective client system and belonging to a distinct event cluster previously determined by event clustering engine 72. In the example illustrated in FIG. 12, each component of the event profile is determined according to a cluster allegiance measure indicative of a proportion of events belonging to the respective event cluster $C_i$, determined as a fraction of a total count of events available from the respective client system. For instance, when event clustering engine 72 has identified three event clusters $C_1$, $C_2$, and $C_4$, an event profile vector [0.1, 0.75, 0.15] may represent a client system wherein 10% of events occurring on the respective client system belong to event cluster $C_1$, while 75% of events belong to event cluster $C_2$ and 15% of events belong to event cluster $C_3$.

In the exemplary embodiment illustrated in FIG. 11, each client system is represented in a multi-dimensional profile space according to the respective event profile. Stated otherwise, each coordinate of a client system represents a component of the respective client's event profile. FIG. 11 shows three exemplary client clusters/profiles 82a-c. A skilled artisan may use any method known in the art of machine learning or data mining to construct such profiles; exemplary methods include variants of a k-means clustering algorithm and neural networks, among others. Alternative embodiments may use other criteria of assigning a client system to a cluster, or use such criteria in addition to the event profile of the respective client. Exemplary additional client clustering criteria include, among others, an owner and/or user of the respective client system, a network address of the respective client system, a device type of the respective client system, etc. For instance, clients belonging to the same family, the same corporation, or the same network domain may be grouped together in the same cluster.

Following client clustering, profiling engine 60 may save cluster parameters, such as a list of client systems assigned to each cluster/profile, coordinates of cluster archetypes (e.g., centroids), cluster diameters, etc., to profile database 19.

Figure 13:
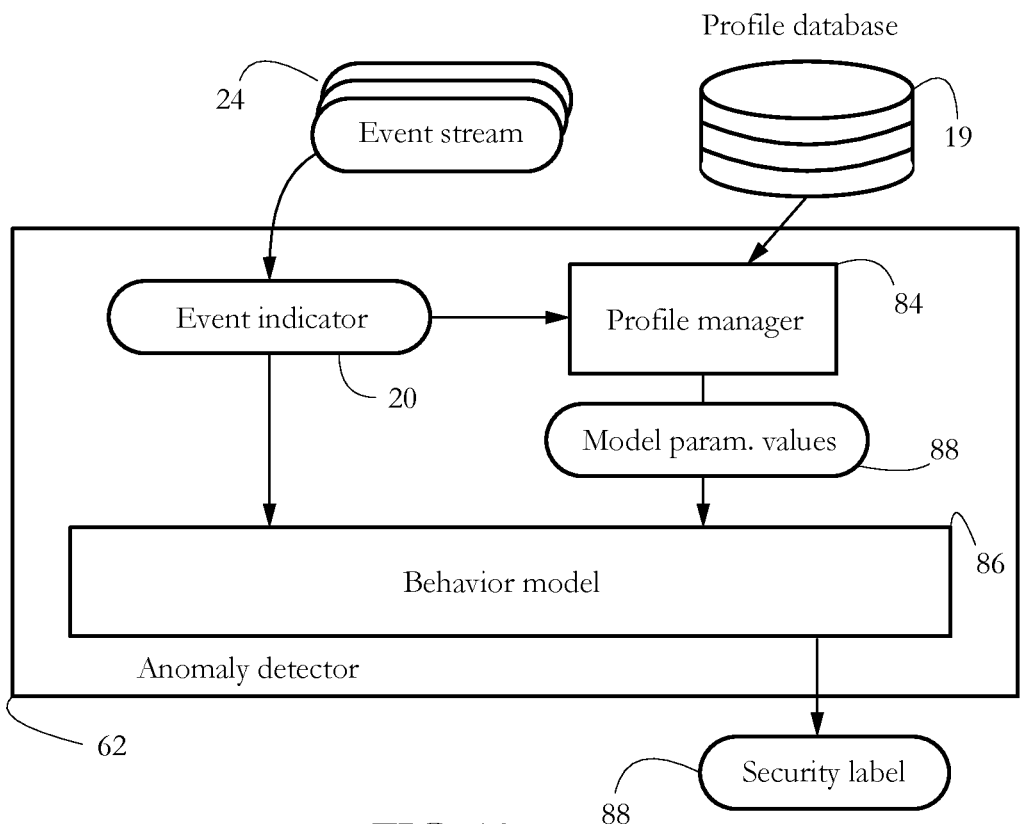
FIG. 13 shows exemplary components and operation of an anomaly detector according to some embodiments of the present invention.

FIG. 13 illustrates exemplary components and operation of anomaly detector 62 according to some embodiments of the present invention (see also FIG. 5). Anomaly detector 62 is configured to receive an event stream 24 comprising event indicators indicative of events occurring on various client systems, and in response, to output a security label 88 indicating whether the respective events are indicative of a security threat such as intrusion or execution of malicious software. In some embodiments, anomaly detector 62 comprises a profile manager 84 configured, in response to receiving an event notification indicative of an event occurring on a protected client system, to select a client profile according to the respective event. Profile manager 84 is further connected to a behavior model 86 configured to determine whether the respective event fits a pattern of normal/baseline behavior represented by the respective profile. When no, the respective event may be considered an anomaly, thus indicative of a possible attack on the respective client system.

In preparation for performing anomaly detection as shown below, some embodiments of anomaly detector 62 are first trained on an event corpus, using an output of profiling engine 60. One purpose of training anomaly detector 62 is to determine a normal/baseline user behavior for each client profile identified by profiling engine 60. Training comprises adjusting a set of parameters of behavior model 86 until a termination criterion is satisfied. The event corpus used for training anomaly detector 62 may differ from training corpus 18 used to train components of profiling engine 60.

Figure 14:
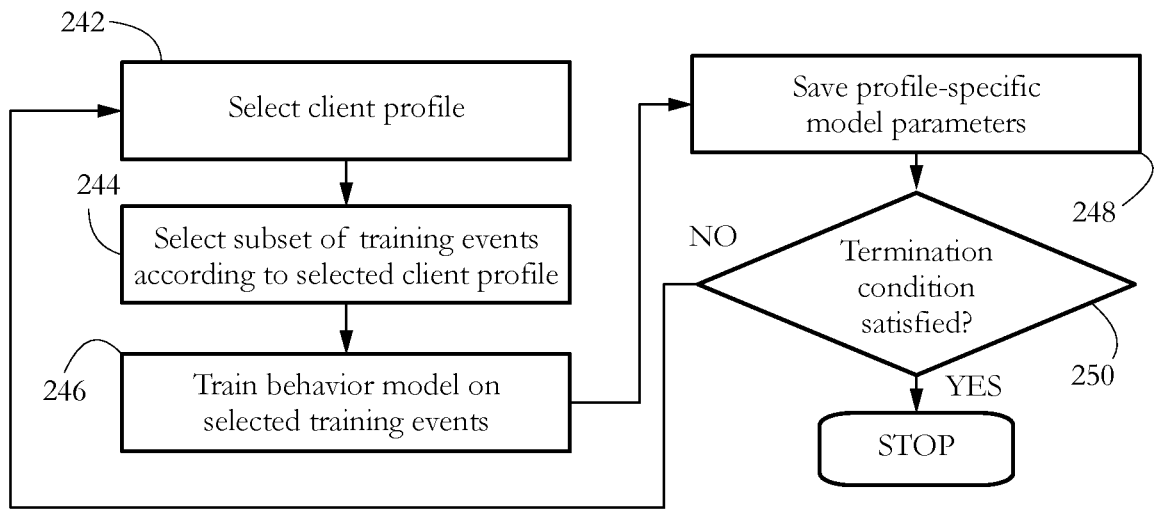
FIG. 14 illustrates an exemplary sequence of steps performed by the anomaly detector during training, according to some embodiments of the present invention.

FIG. 14 shows an exemplary sequence of steps performed by anomaly detector 62 during a training procedure according to some embodiments of the present invention. In response to anomaly engine 60 constructing a set of client profiles, a step 242 selects one such client profile from profile database 19. In some embodiments, each such client profile comprises a set of client clusters, for instance cluster 82a in FIG. 11. Each client cluster further includes a selected subset of protected client systems. A step 244 may select a training set of events registered as occurring on any client system associated with the respective profile/cluster. In some embodiments, step 244 may comprise selected the training set of events from training corpus 18 already used for constructing client profiles as shown above. A further step 246 may use the respective training set of events as training corpus to train behavior model 86.

Figure 15:
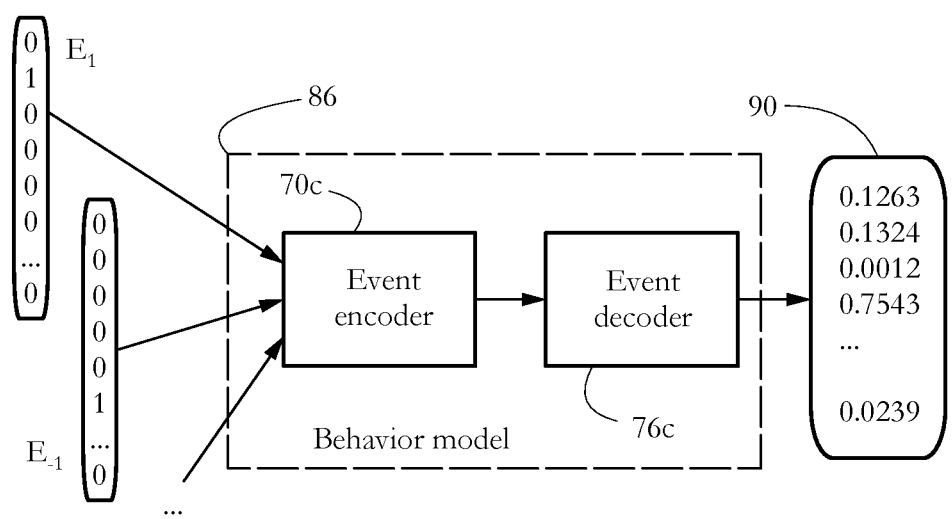
FIG. 15 shows exemplary components of a behavior model forming part of the anomaly detector according to some embodiments of the present invention.

In some embodiments, behavior model 86 comprises components which are similar in structure and function to some components of profiling engine 60. For instance, some embodiments of model 86 include an encoder-decoder pair as illustrated in FIG. 15, which may be constructed using neural network technology and trained according to a member of the word2vec family of algorithms (see description above in relation to FIGS. 8-A-B). Training behavior model 86 may then amount to adjusting parameters of encoder 70c and/or decoder 76c (e.g., a set of synapse weights) with the aim of representing each event from the respective client cluster/profile as a vector in an event embedding space. In a preferred embodiment, encoder 70c analyzes each event in the context of an event sequence and generates an embedding space wherein events that occur predominantly in similar contexts are separated by a smaller distance, compared to events that occur in other contexts. However, the event embedding space (i.e., the meaning of the axes, size of inter-event distances, etc.) resulting from training encoder 70c may differ substantially from the event embedding space resulting from training event encoder 70, because the training corpora used for the two encoders are distinct.

In a preferred embodiment, step 246 comprises training the encoder-decoder pair using a version of the bag-of-words algorithm (see FIG. 8-B). In one such example, the encoder-decoder pair (FIG. 15) is configured to receive a plurality of events $E_{-k}, \ldots E_{-1}, E_1, \ldots E_p$ representing an event context of a currently analyzed event sequence, and to produce an N-dimensional prediction score vector 90, wherein each element is associated with a distinct event type, each element representing a likelihood that the central event of the respective event sequence is of the respective event type. For instance, a higher score value may indicate that the respective event type is more likely to occur as the central event of the respective event sequence than other event types having lower scores. In such embodiments, an exemplary training of model 86 may comprise selecting event sequences from the subset of events identified in step 244 (FIG. 14), inputting the event context of the respective sequence to encoder 70c, executing decoder 76c to produce a prediction for the central event $E_0$ of the respective event sequence, and punishing incorrect predictions by backpropagating the prediction error through the neural networks that form encoder 70c and/or decoder 76c. In response to a successful training, a step 248 may save parameter values of the trained behavior model. The training procedure may be repeated for each client profile identified by profiling engine 60.

Figure 16:
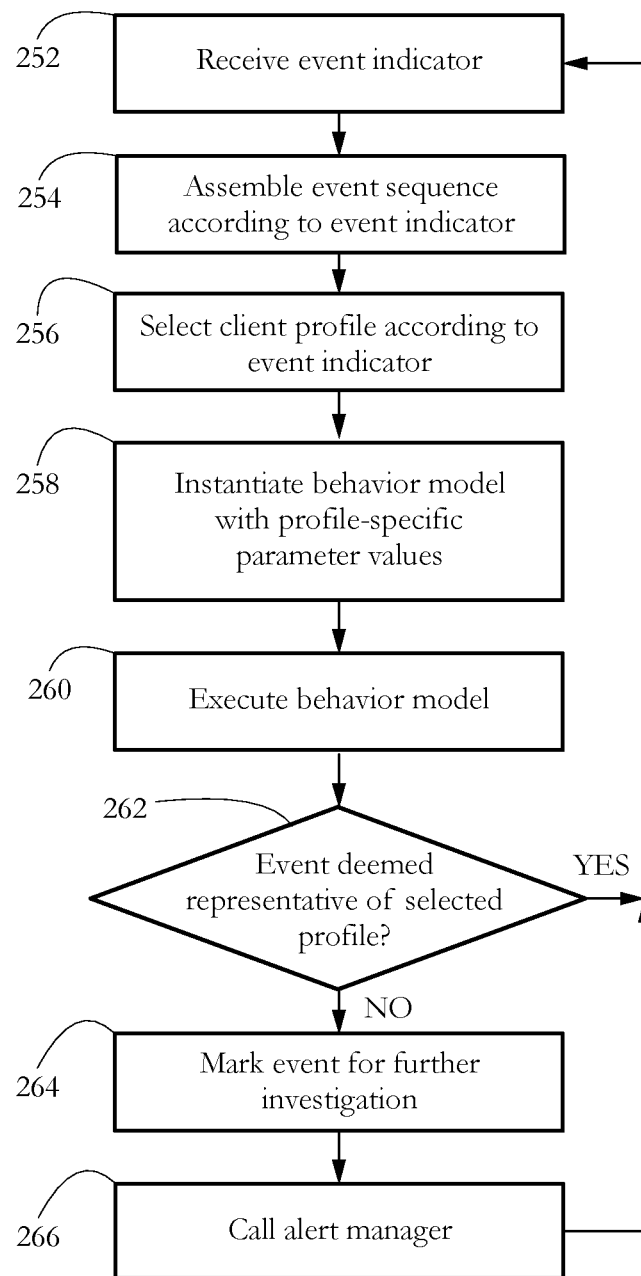
FIG. 16 illustrates an exemplary sequence of steps performed by the trained anomaly detector according to some embodiments of the present invention.

FIG. 16 illustrates an exemplary sequence of steps performed by anomaly detector 62 to protect a target client system (such as clients 10a-h in FIG. 1) against computer security threats according to some embodiments of the present invention. The target client system may or may not be a member of the subset of clients providing the training corpus of events that produced behavior models and/or client profiles as shown above. To protect the target client system, events may be detected at the target client system and/or other devices such as routers 15a-b (see FIG. 1) and may be communicated to security server 16 in the form of event indicators. Such event indicators may be then preprocessed according to their source, event type, timing, service account settings, etc., and organized as event stream 24. Events may be processed individually or in batches. In response to receiving an event indicator from the target client system, in a step 254 anomaly detector 62 may assemble an event sequence to analyze according to the respective event indicator. Step 254 may include identifying the event source (i.e., client system where the respective event has occurred), selecting from event stream 24 a plurality of other events to form an event sequence. In some embodiments, members of the sequence are chosen so they all originated at the same target client system. In another example, all members of the sequence must occur on a pre-determined subset of client systems, such as a network subdomain, or a common IP address, for instance. Chosen events may also be ordered according to their time of occurrence and/or detection, for instance using a timestamp provided with the incoming event indicator. The event sequence may be further split into parts, for instance identifying a central event and an event context (see e.g., FIG. 8-A).

In a step 256, profile manager 84 may select a client profile according to the respective event indicator, e.g., according to an identity of the target client system where the respective event has occurred. When the respective target client system has provided training events for the development of client profiles and/or for the training of behavior models, step 256 may comprise selecting a client profile/cluster having the respective target client system as a member. Other profile selection criteria may also be used. For instance, step 256 may comprise selecting a client profile according to a position of the target client system within a client profile space (see FIG. 11), e.g., by comparing the position of the target client system with a set of cluster archetypes or centroids and selecting the cluster/profile whose centroid is closest to the target client system. In one such example, the client profile may be selected according to an event profile determined for the target client system (e.g., according to a count of events received from the target client system, that fit into a particular event category/cluster). Other client profile selection criteria may include selecting the client profile according to a network address of the target client system (e.g., selecting a client profile containing clients having the same IP address as the target client system), to an owner/user of the target client system (e.g., selecting a profile containing members of the same household as the target client system), etc.

In a further step 258, anomaly detector may instantiate behavior model 86 with parameter values specific to the respective selected client profile. In some embodiments, following profile-specific instantiation, executing model 86 (step 260) comprises projecting events of the respective event sequence in the event embedding space associated with the respective client profile.

A step 262 may now determine whether the event(s) of the respective event sequence are representative of the normal/baseline user behavior associated with the respective client profile or not. In one embodiment, in step 260 comprises feeding the event context ($E_i$, i≠0) of the respective sequence to behavior model 86 and computing the prediction score vector 90 of the respective sequence. Step 262 may then comprise identifying the element of vector 90 corresponding to the event type of the actual central event $E_0$ of the sequence, and comparing the respective score to a pre-determined threshold (e.g., 0.95). In some embodiments, a score value lower than the threshold indicates that the respective event $E_0$ is substantially unlikely to occur in the respective event context, and therefore indicates an anomaly consistent with a potential computer security threat. In some embodiments, a user or administrator of security server 16 may tune the sensitivity of the method by adjusting the value of the threshold. In one such example, different threshold values are associated with different groups of client systems.

In an alternative embodiment, step 260 may comprise using model 86 to determine a representation of an event $E_i$ of the sequence in the event embedding space specific to the respective client profile. Step 262 may then comprise determining whether event $E_i$ fits a pattern of normal behavior for the respective client profile according to a position of the respective event within the embedding space. For instance, an event may be deemed normal when it is positioned within a cluster of training events (e.g., closer to a cluster centroid than a pre-determined threshold). In another example, an event may be considered normal/benign when located in certain regions of the embedding space, and anomalous when located in other regions.

When an event of the sequence (e.g., $E_0$) is considered an anomaly, or in other words not fitting the pattern of normalcy established through training for the respective client profile, a step 264 may mark the respective event for further analysis. In some embodiments, an anomaly may trigger the transmission of a security alert by an alert manager 64 of security server 16 (see FIG. 5). Security alerts may go out to the client system where the anomalous event has occurred and/or to an administrator of the respective client system. Incidents of anomalous events may also be gathered and reported for further analysis to a computer security lab.

The exemplary systems and methods described above allow an efficient detection of computer security threats such as malicious software and intrusion. The disclosed systems and methods implement a behavioral approach to computer security, wherein a normal/baseline user behavior is automatically inferred by the system according to a training corpus of events, and wherein a departure from a baseline behavior pattern may indicate a threat.

Some embodiments detect various events occurring at a plurality of client systems, e.g., computers, mobile telephones, network appliances, and virtual machines. Exemplary events include specific process launches, attempts to access certain files or network locations, and network traffic events like accessing certain ports and addresses, among others. A skilled artisan will understand that the systems and methods described herein may be adapted to other kinds of events, such as events related to a user's activity on social media, a user's browsing history, and a user's gaming activity, among others. Event notifications are aggregated at a security server. A collection of such events may be used as a training corpus to construct a set of client profiles, wherein each client profile may represent a single user, a single machine, or multiple users/machines. In some embodiments, each client profile comprises a subset of client systems and/or a subset of events that have occurred on the respective subset client systems. Each client profile may represent a normal and/or benign pattern of usage of the respective client systems. Such client profiles may then be used to detect incidents of anomalous behavior, which may be indicative of a computer security threat.

Some conventional computer security operate according to a set of rules that quantify behavior that is indicative of malice. Since developers are typically interested in offering such solutions to a wide variety of clients, behavioral rules are usually generic and not tailored to specific users. However, in practice, users are very heterogeneous. Even within the same company or family, the manner in which each member uses a computer may vary substantially. A set of actions that may be considered normal for a software developer or engineer may be very unusual when detected on a computer in the accounting department. Furthermore, the same user may have substantially different behaviors at work versus at home. Therefore, generic behavioral rules may not capture the diversity and specificity of real users. In contrast to such conventional systems, in some embodiments of the present invention, events occurring on each client system are reviewed and analyzed selectively against a model capturing a normal/baseline behavior of the respective client system itself and/or of similar clients. Stated otherwise, boundaries of behavioral "normality" may be defined with substantial specificity: a specific client machine, a specific group of users (e.g., a particular department of a company, members of a family, a particular age group), etc.

Due to the proliferation of software and Internet use, an attempt to develop highly specific behavior profiles, for instance profiles attached to each individual user, may require unreasonable computational resources and may therefore be impractical. Furthermore, collecting events from individual users/machines may not provide enough data to develop statistically robust behavior models. In contrast to this approach, some embodiments of the present invention group multiple users and/or machines into a single client profile, thus ensuring a useful trade-off between specificity, robustness, and computational costs. In addition, the manner in which users and machines are grouped into profiles is in itself based on behavioral criteria, to ensure that such grouping preserves specificity. In some embodiments, each client profile groups together users/machines that have substantially similar event profiles. Stated otherwise, all members of a client profile display a similar baseline behavior in terms of a statistic of events occurring on the member machines.

Some conventional computer security systems and methods mostly analyze individual events. Many events occurring during operation of a computer system (e.g., opening a file, accessing a webpage) may not be indicative of malice when taken in isolation. However, they may be malicious when they occur in the context of other events, for instance as a particular sequence of actions. In contrast to more conventional solutions, some embodiments of the present invention explicitly analyze events in context and are therefore better suited to such event correlation situations. A preferred embodiment represents individual events as vectors in a multidimensional embedding space having the distinctive property that a pair of events that occur with relatively high frequency in the same event context are separated by a smaller distance than another pair of events that occur less frequently in the same event context.

Successful behavioral modeling may require detecting a large number (e.g., hundreds or thousands) of distinct event types, but not all event types may be equally important in behavioral modelling. Gathering and analyzing statistical data on such numerous event types received from a large number of sources may be impractical. To address this problem, some embodiments group events into event categories or clusters according to a degree of similarity between events, thus creating more robust and/or relevant statistics. Construction of client profiles may be substantially facilitated by such meaningful dimensionality reduction. Event similarity may be determined according to several criteria, for instance, according to a distance separating two events in an event embedding space. In a preferred embodiment, two events may be considered similar if they occur predominantly in the same context (e.g., events A and B are considered similar when both A and B are frequently preceded by event X and/or followed by event Y, i.e., as in exemplary sequences XAY and XBY).

FIGS. 17-A-B illustrate an experiment of applying some of the systems and methods described above to the detection of computer security threats. An event corpus of events collected from multiple monitored clients was used to train components of a profiling engine as shown above, resulting in the monitored clients being divided into 11 client clusters/profiles. Events were binned into event categories according to a representation of each event in a 15-dimensional embedding space. Profile-specific behavior models were developed for each of the respective client clusters. A particular type of attack was then staged on a test machine. Event sequences harvested from the test machine were fed to an anomaly detector instantiated, in turn, with parameters specific to each of the behavior models. Some such event sequences were detected as anomalies.

FIG. 17-A shows cluster-specific anomaly scores, represented on a scale wherein a score of 1 indicates 100% certainty of an anomaly (e.g., at least one event of an event sequence received from the test machine had not been seen in training). The graph represents score values averaged over anomalous event sequences, and the associated standard deviations. The figure shows that the same sequence(s) may be considered anomalies with a certainty level that is cluster-specific. Stated differently, the same event sequences are considered "less anomalous" on certain clients than on others. For instance, behavior models associated with clusters 1, 2, and 7 not only detect the attack relatively higher efficiency than other models, but all event sequences associated with the attacks were considered "equally anomalous". In contrast, the models associated with clusters 0 and 9 indicate some event sequences of the same attack as "less anomalous" than others.

FIG. 17-B shows profile-specific average detection rates achieved for three distinct types of attacks. Event sequences collected from the test machine during each type of attack were analyzed using each of the 11 profile-specific trained behavior models. The detection rate differs among models and types of attack, which further attests to the specificity of some of the systems and methods described herein.

Such experimental results indicate another potential application of some embodiments of the present invention. A centralized computer security solution may selectively develop protection strategies for each set of clients identified by a client profile and/or for other clients that bear a similarity to an archetype of each client cluster. Some embodiments may identify clusters of clients for which methods described herein offer a satisfactory degree of security, and other clusters of clients which require additional security measures. Tailoring protection to each cluster of clients may improve user experience and reduce unnecessary computational expense.

It will be clear to one skilled in the art that the above embodiments may be altered in many ways without departing from the scope of the invention. Accordingly, the scope of the invention should be determined by the following claims and their legal equivalents.

What is claimed is:

1. A server computer system comprising at least one hardware processor configured to:
    in response to an occurrence of a target event on a target client system, the target event selected from a group consisting of a launch of a process and an attempt to access a file, determine according to the target event whether the target client system comprises malicious software; and in response to a determination that the target client system comprises malicious software, perform a security action to protect the target client system;
wherein determining whether the target client system comprises malicious software comprises:
determining an event context of the target event, the event context comprising a set of events having occurred on the target client system prior to the target event and another set of events having occurred on the client system following the target event,
selecting a client profile from a plurality of pre-determined client profiles according to the target event, the selected client profile characterizing a baseline behavior of a selected cluster of client systems,
in response to selecting the client profile, employing a behavior model specific
to the selected client profile to determine a plurality of prediction scores according to the event context, each score of the plurality of prediction scores determined for a distinct event type and indicative of a likelihood that an event of the distinct event type would occur in the event context for the selected client profile,
selecting, from the plurality of prediction scores, a score determined for an event type of the target event, and
comparing the selected score to a pre-determined threshold; and
wherein a composition of the selected cluster of client systems is determined by analyzing a collection of events having occurred on a plurality of client systems to determine which of the plurality of client systems show similar behavior.

2. The computer system of claim 1, wherein determining whether the target client system comprises malicious software comprises:
when the selected score indicates that the target event is likely to occur in the event context, determining that the target client system does not comprise malicious software; and
when the selected score indicates that the target event is not likely to occur in the event context, determining that the target client system comprises malicious software.

3. The computer system of claim 1, wherein determining whether the target client system comprises malicious software comprises:
determining a predicted event according to the plurality of prediction scores;
comparing the predicted event to the target event; and
in response, determining whether the target client system comprises malicious software according to a result of the comparison.

4. The computer system of claim 1, wherein:
the behavior model comprises an event encoder configured to determine a set of coordinates indicative of a position of the target event in an event embedding space; and
the hardware processor is further configured to determine whether the target client system comprises malicious software according to the position.

5. The computer system of claim 1, wherein determining the composition of the selected cluster of client systems comprises:
constructing a plurality of event categories according to whether a selected event of the collection of events occurs in a selected context of other events of the collection of events;
in response to constructing the plurality of event categories, deciding whether each client system belongs to the selected cluster of client systems according to an event profile of the each client system, the event profile determined according to a count of events occurring on the each client system and belonging to a selected event category of the plurality of event categories.

6. The computer system of claim 1, wherein training the behavior model comprises:
assembling a training sequence of events having a training central event and a training event context, wherein each member of the training sequence is selected from the collection of events according to whether the each member has occurred on a member of the selected cluster of client systems;
employing the behavior model, in response to receiving the training event context of the training sequence, to produce a training prediction indicative of a likelihood that the training central event belongs to the training sequence; and
adjust a set of parameter values of the behavior model according to the training prediction.

7. The computer system of claim 1, further configured to select the client profile according to whether the target client system is a member of the selected cluster.

8. The computer system of claim 1, wherein selecting the client profile comprises:
determining a set of coordinates indicating a position of the target client system in a multidimensional embedding space;
in response, selecting a target cluster of the plurality of clusters according to the set of coordinates; and
selecting the client profile according to the target cluster.

9. The computer system of claim 8, configured to select the target cluster further according to another set of coordinates indicating a position of a member of the target cluster in the embedding space.

10. A computer-implemented method comprising:
in response to an occurrence of a target event on a target client system, the target event selected from a group consisting of a launch of a process and an attempt to access a file, employing at least one hardware processor of a computer system in determining according to the target event, whether the target client system comprises malicious software; and
in response to a determination that the target client system comprises malicious software, performing a security action to protect the target client system;
wherein determining whether the target client system comprises malicious software comprises:
determining an event context of the target event, the event context comprising a set of events having occurred on the target client system prior to the target event and another set of events having occurred on the client system following the target event,
selecting a client profile from a plurality of pre-determined client profiles according to the target event, the selected client profile characterizing a baseline behavior of a selected cluster of client systems,
in response to selecting the client profile, employing a behavior model specific to the selected client profile to determine a plurality of prediction scores according to the event context, each score of the plurality of prediction scores determined for a distinct event type and indicative of a likelihood that an event of the distinct event type would occur in the event context for the selected client profile, selecting, from the plurality of prediction scores, a score determined for an event type of the target event, and
comparing the selected score to a pre-determined threshold; and
wherein a composition of the selected cluster of client systems is determined by analyzing a collection of events having occurred on a plurality of client systems to determine which of the plurality of client systems show similar behavior.

11. The method of claim 10, wherein determining whether the target client system comprises malicious software comprises:
when the selected score indicates that the target event is likely to occur in the event context, determining that the target client system does not comprise malicious software; and
when the selected score indicates that the target event is not likely to occur in the event context, determining that the target client system comprises malicious software.

12. The method of claim 10, wherein determining whether the target client system comprises malicious software comprises:
determining a predicted event according to the plurality of prediction scores;
comparing the predicted event to the target event; and
in response, determining whether the target client system comprises malicious software according to a result of the comparison.

13. The method of claim 10, wherein:
the behavior model comprises an event encoder configured to determine a set of coordinates indicative of a position of the target event in an event embedding space; and
the at least one hardware processor is further configured to determine whether the target client system comprises malicious software according to the position.

14. The method of claim 10, wherein determining the composition of the selected cluster of client systems comprises:
constructing a plurality of event categories according to whether a selected event of the collection of events occurs in a selected context of other events of the collection of events;
in response to constructing the plurality of event categories, deciding whether each client system belongs to the selected cluster of client systems according to an event profile of the each client system, the event profile determined according to a count of events occurring on the each client system and belonging to a selected event category of the plurality of event categories.

15. The method of claim 10, wherein training the behavior model comprises:
assembling a training sequence of events having a training central event and a training event context, wherein each member of the training sequence is selected from the collection of events according to whether the each member has occurred on a member of the selected cluster of client systems;
employing the behavior model, in response to receiving the training event context of the training sequence, to produce a training prediction indicative of a likelihood that the training central event belongs to the training sequence; and
adjusting a set of parameters of the behavior model according to the training prediction.

16. The method of claim 10, further comprising selecting the client profile according to whether the target client system is a member of the selected cluster.

17. The method of claim 10, wherein selecting the client profile comprises:
determining a set of coordinates indicating a position of the target client system in a multidimensional embedding space;
in response, selecting a target cluster of the plurality of clusters according to the set of coordinates; and
selecting the client profile according to the target cluster.

18. The method of claim 17, comprising selecting the target cluster further according to another set of coordinates indicating a position of a member of the target cluster in the embedding space.

19. A non-transitory computer-readable medium storing instructions which, when executed by at least one hardware processor of a computer system, cause the computer system to:
in response to an occurrence of a target event on a target client system, the target event selected from a group consisting of a launch of a process and an attempt to access a file, determine according to the target event whether the target client system comprises malicious software; and
in response to a determination that the target client system comprises malicious software, perform a security action to protect the target client system;
wherein determining whether the target client system comprises malicious software comprises:
determining an event context of the target event, the event context comprising a set of events having occurred on the target client system prior to the target event and another set of events having occurred on the client system following the target event,
selecting a client profile from a plurality of pre-determined client profiles according to the target event, the selected client profile characterizing a baseline behavior of a selected cluster of client systems,
in response to selecting the client profile, employing a behavior model specific to the client profile to determine a plurality of prediction scores according to the event context, each score of the plurality of prediction scores determined for a distinct event type and indicative of a likelihood that an event of the distinct event type would occur in the event context for the selected client profile,
selecting, from the plurality of prediction scores, a score determined for an event type of the target event, and
comparing the selected score to a predetermined threshold; and
wherein a composition of the selected cluster of client systems is determined by analyzing a collection of events having occurred on a plurality of client systems to determine which of the plurality of client systems show similar behavior.

20. The computer system of claim 1, wherein the at least one hardware processor is configured to select the client profile further according to a current user of the target client system.

21. The method of claim 10, wherein the at least one hardware processor is configured to select the client profile further according to a current user of the target client system.

22. The computer system of claim 1, wherein the event context of the target event comprises an attempt by the target client system to access a selected network location.

23. The method of claim 10, wherein the event context of the target event comprises an attempt by the target client system to access a selected network location.

\* \* \* \* \*